United States Patent
Grocutt et al.

(10) Patent No.: US 10,025,923 B2
(45) Date of Patent: *Jul. 17, 2018

(54) DATA PROCESSING APPARATUS AND METHOD FOR PROTECTING SECURE DATA AND PROGRAM CODE FROM NON-SECURE ACCESS WHEN SWITCHING BETWEEN SECURE AND LESS SECURE DOMAINS

(71) Applicant: ARM Limited, Cambridge (GB)

(72) Inventors: Thomas Christopher Grocutt, Impington (GB); Richard Roy Grisenthwaite, Guilden Morden (GB); Simon John Craske, Cambridge (GB)

(73) Assignee: ARM Limited, Cambridge (GB)

(*) Notice: Subject to any disclaimer, the term of this patent is extended or adjusted under 35 U.S.C. 154(b) by 201 days.

This patent is subject to a terminal disclaimer.

(21) Appl. No.: 14/935,504

(22) Filed: Nov. 9, 2015

(65) Prior Publication Data
US 2016/0063242 A1 Mar. 3, 2016

Related U.S. Application Data

(63) Continuation of application No. 13/680,352, filed on Nov. 19, 2012, now Pat. No. 9,213,828, which is a
(Continued)

(30) Foreign Application Priority Data

Oct. 1, 2012 (GB) .................................. 1217531.1

(51) Int. Cl.
*G06F 21/52* (2013.01)
*G06F 9/30* (2018.01)
*G06F 9/46* (2006.01)

(52) U.S. Cl.
CPC .......... *G06F 21/52* (2013.01); *G06F 9/30134* (2013.01); *G06F 9/462* (2013.01); *G06F 2221/034* (2013.01); *G06F 2221/2105* (2013.01)

(58) Field of Classification Search
CPC .... G06F 21/74; G06F 9/30101; G06F 9/3009; G06F 12/1491; G06F 2209/481
See application file for complete search history.

(56) References Cited

U.S. PATENT DOCUMENTS

| 4,177,514 A | 12/1979 | Rupp | |
|---|---|---|---|
| 4,488,227 A * | 12/1984 | Miu | ........................ G06F 9/268 710/262 |

(Continued)

FOREIGN PATENT DOCUMENTS

| CN | 1711524 | 12/2005 |
|---|---|---|
| CN | 1711525 | 12/2005 |

(Continued)

OTHER PUBLICATIONS

The ARM-THUMB Procedure Call Standard, Oct. 24, 2000, ARM Limited, Issue B-01, downloaded from http://infocenter.arm.com/help/topic/com.arm.doc.espc0002/ATPCS.pdf on Sep. 21, 2013.*

(Continued)

*Primary Examiner* — Carl G Colin
*Assistant Examiner* — Gary E Lavelle
(74) *Attorney, Agent, or Firm* — Nixon & Vanderhye P.C.

(57) ABSTRACT

A data processing apparatus includes processing circuitry and a data store including a plurality of regions including a secure region and a less secure region. The secure region is configured to store sensitive data accessible by the circuitry when operating in a secure domain and not accessible by the circuitry when operating in a less secure domain. The data store includes a plurality of stacks with a secure stack in the
(Continued)

secure region. Stack access circuitry is configured to store predetermined processing state to the secure stack. The processing circuitry further comprises fault checking circuitry configured to identify a first fault condition if the data stored in the predetermined relative location is the first value. This provides protection against attacks from the less secure domain, for example performing a function call return from an exception, or an exception return from a function call.

19 Claims, 16 Drawing Sheets

Related U.S. Application Data continuation-in-part of application No. 13/368,419, filed on Feb. 8, 2012, now Pat. No. 9,477,834.

(56) References Cited

U.S. PATENT DOCUMENTS

| | | | |
|---|---|---|---|
| 4,519,032 A | 5/1985 | Mendell | |
| 5,590,332 A | 12/1996 | Baker | |
| 5,812,850 A | 9/1998 | Wimble | |
| 6,363,474 B1 | 3/2002 | McCulley et al. | |
| 6,993,663 B1 * | 1/2006 | Paya | G06F 21/52 711/163 |
| 7,120,794 B2 * | 10/2006 | Kelley | G06F 9/468 713/164 |
| 7,966,466 B2 | 6/2011 | Kershaw et al. | |
| 7,984,257 B2 | 7/2011 | Funk et al. | |
| 8,051,467 B2 | 11/2011 | Renno | |
| 9,116,711 B2 | 8/2015 | Grocutt | |
| 9,202,071 B2 | 12/2015 | Grocutt et al. | |
| 9,213,828 B2 | 12/2015 | Grocutt et al. | |
| 9,477,834 B2 | 10/2016 | Grocutt et al. | |
| 2002/0099933 A1 | 7/2002 | Nevill et al. | |
| 2004/0003377 A1 | 1/2004 | Di Loreto | |
| 2004/0139346 A1 * | 7/2004 | Watt | G06F 21/74 713/166 |
| 2004/0168047 A1 | 8/2004 | Fukai et al. | |
| 2004/0239346 A1 | 12/2004 | Iyer | |
| 2005/0044292 A1 | 2/2005 | McKeen | |
| 2005/0177666 A1 | 8/2005 | Kimelman et al. | |
| 2006/0224866 A1 * | 10/2006 | Grisenthwaite | G06F 9/30054 712/226 |
| 2006/0259487 A1 | 11/2006 | Havens et al. | |
| 2006/0259764 A1 * | 11/2006 | Asal | G06F 21/74 713/166 |
| 2007/0204259 A1 * | 8/2007 | Wilner | G06F 9/44521 717/124 |
| 2008/0216175 A1 | 9/2008 | Pike | |
| 2008/0250216 A1 | 10/2008 | Kershaw et al. | |
| 2008/0250217 A1 | 10/2008 | Kershaw et al. | |
| 2010/0031360 A1 | 2/2010 | Seshadri et al. | |
| 2010/0057960 A1 | 3/2010 | Renno | |
| 2010/0082927 A1 | 4/2010 | Riou | |
| 2010/0325397 A1 * | 12/2010 | Craske | G06F 9/3013 712/222 |
| 2011/0225402 A1 | 9/2011 | Grisenthwaite | |
| 2012/0036299 A1 | 2/2012 | Renno | |
| 2012/0036341 A1 * | 2/2012 | Morfey | G06F 12/1491 712/229 |
| 2012/0042154 A1 | 2/2012 | Grisenthwaite | |

FOREIGN PATENT DOCUMENTS

| | | |
|---|---|---|
| CN | 100524224 | 8/2009 |
| CN | 101661440 | 3/2010 |
| EP | 0 859 319 | 8/1998 |
| EP | 1 331 539 | 7/2003 |
| GB | 2448149 | 10/2008 |
| GB | 2478733 | 9/2011 |
| GB | 2482701 | 2/2012 |
| JP | 09091154 A | 4/1997 |
| JP | H10-228421 | 8/1998 |
| JP | H11-272462 | 10/1999 |
| JP | 2002-157115 | 5/2002 |
| JP | 2002-526822 | 8/2002 |
| JP | 2004-280801 | 10/2004 |
| JP | 2004-288155 | 10/2004 |
| JP | 2007-58776 | 3/2007 |
| JP | 2008-257735 | 10/2008 |
| JP | 2010-503107 | 1/2010 |
| JP | 2010-186386 | 8/2010 |
| JP | 2011-216118 | 10/2011 |
| WO | 02/42914 | 5/2002 |
| WO | WO 2007/089373 | 8/2007 |
| WO | 2008/030093 | 3/2008 |
| WO | WO 2010/004240 | 1/2010 |
| WO | 2011/114124 | 9/2011 |

OTHER PUBLICATIONS

Cortex-M3 Technical Reference Manual, ARM Limited, Revision r1 p1 , Jun. 13, 2007, downloaded from http://infocenter.arm.com/help/topic/com.arm.doc.ddi0337e/DDI0337E_cortex_m3_r1p1_trm.pdf on Sep. 21, 2017.*
Final Office Action dated Sep. 22, 2016 in co-pending U.S. Appl. No. 13/735,350, 54 pages.
Office Action dated Jan. 21, 2016 in co-pending U.S. Appl. No. 13/368,419 66 pages.
English translation of Chinese Office Action dated Feb. 13, 2017 in CN 201380050004.4, 5 pages.
Office Action dated Mar. 10, 2016 in co-pending U.S. Appl. No. 13/735,350, 58 pages.
English translation of Chinese Second Office Action dated Mar. 9, 2017 in CN 201380008433.5, 6 pages.
Office Action dated Jun. 29, 2017 in co-pending U.S. Appl. No. 14/795,933, 52 pages.
ARM Limited, ARMv6-M Architecture Reference Manual, Sep. 2010, Issue C, 436 pages.
ARM Limited, Cortex-M3 Technical Reference Manual, Jun. 2007, Rev: r1p1, Issue E, 384 pages.
English translation of Israeli Office Action dated Feb. 14, 2017 in IL 233726, 2 pages.
English translation of Japanese Office Action dated Feb. 13, 2017 in JP 2013-012980, 8 pages.
English translation of Chinese Office Action dated Jan. 3, 2017 in CN 201310038646.4, 13 pages.
U.S. Appl. No. 15/284,830, filed Oct. 4, 2016; Inventor: Grocutt et al.
English translation of Chinese Office Action dated Jun. 28, 2016 in CN 201380008433.5, 10 pages.
U.S. Appl. No. 12/680,352, filed Nov. 19, 2012, Grocutt et al.
Office Action dated Dec. 26, 2014 in U.S. Appl. No. 13/680,352.
U.S. Appl. No. 13/735,350, filed Jan. 7, 2013, Grocutt et al.
U.S. Appl. No. 13/741,709, filed Jan. 15, 2013, Grocutt et al.
U.S. Appl. No. 13/368,419, filed Feb. 8, 2012, Grocutt et al.
U.S. Appl. No. 14/795,933, filed Jul. 10, 2015, Grocutt.
International Search Report and Written Opinion of the International Searching Authority dated May 7, 2013 in PCT/GB2013/050102, 8 pages.
GB Search Report dated Aug. 14, 2013 in GB 1220769.2, 3 pages.
International Search Report and Written Opinion of the International Searching Authority dated Sep. 20, 2013 in PCT/GB2013/052105, 8 pages.
International Search Report and Written Opinion of the International Searching Authority dated Oct. 7, 2013 in PCT/GB2013/052107, 8 pages.
International Search Report and Wirtten Opinion of the International Seacrching Authority dated Sep. 27, 2013 in PCT/GB2013/052108, 9 pages.
ARM Limited, "Cortex-M3 Technical Reference Manual" Revision: r1p1, Dec. 2005, 42 pages.

(56) References Cited

OTHER PUBLICATIONS

International Preliminary Report on Patentability dated Aug. 21, 2014 in PCT/GB2013/050029, 6 pages.
Office Action dated Dec. 2, 2014 in co-pending U.S. Appl. No. 13/368,419, 74 pages.
Office Action dated Dec. 4, 2014 in co-pending U.S. Appl. No. 13/680,298, 44 pages.
Office Action dated Feb. 13, 2015 in co-pending U.S. Appl. No. 13/735,350, 59 pages.
Office Action dated Dec. 12, 2014 in co-pending U.S. Appl. No. 13/741,709, 48 pages.
ARM Limited, Cortex-M3, Revision: r1p1, Technical Reference Manual, 2006, ARM Limited, downloaded from http://infocenter.arm.com/help/topic/com.arm.doc.ddi0337e/DDI0337E_cortex_m3_r1p1_trm.pdf on Oct. 2, 2014, pp. 1-22, 2, 3, 5-2, 5-9, 5-10, 5-11 and 5-22 (384 pages).
Cocke et al, "Scheme to Improve the Call/Return Performance on the RS/6000" Jul. 1, 1993, IBM, pp. 143-145.
ARM Limited, Arm® v7-M Architecture Reference Manual, Feb. 2010, ARM Limited, C_errata_v3, https://web.eecs.umich.edu/~prabal/teaching/eecs373-f10/readings/ARMv-7M_ARM.pdf on Dec. 16, 2014, 716 pages.
Micromint USA, Eagle interrupts Example, Jun. 20, 2010, micromint.com, downloaded from http://wiki.mirocmint.com/index.php/Eagle_interupts_Example on Nov. 12, 2014, pp. 1-2.
International Preliminary Report on Patentability dated Jan. 29, 2014 in PCT/GB2013/050102, 23 pages.
International Preliminary Report on Patentability dated Oct. 7, 2014 in PCT/GB2013/052107, 6 pages.
International Preliminary Report on Patentability dated Apr. 16, 2015 in PCT/GB2013/052105, 5 pages.
International Preliminary Report on Patentability dated Apr. 16, 2015 in PCT/GB2013/052108, 6 pages.
Office Action dated Jun. 22, 2015 in co-pending U.S. Appl. No. 13/368,419 79 pages.
Office Action dated Aug. 31, 2015 in co-pending U.S. Appl. No. 13/735,350, 59 pages.
ARM Limited, ARM Procedure Call Standard for the ARM Architecture, Oct. 16, 2009, release 2.08, downloaded from https://web.eecs.umich.edu/~prabal/teaching/eecs373-fll/readings/ARM-AAPCS-EABI-v2.08.pdf on Dec. 14, 2014, 34 pages.
ARM Limited, Corex-M3Technical Reference Manual, Jun. 13, 2007, ARM Limited, Revision r1p1, Chapters 5, 10 and 11, downloaded from http://infocenter.arm.com/help/topic/com.arm.doc.ddi0337e/DDI0337E_cortex_m3_r1p1_trm.pdf, 97 pages.
International Search Report and Written Opinion of the International Searching Authority dated Sep. 27, 2013 in PCT/GB2013/052108, 9 pages.
ARM Limited, ARM® v7-M Architecture Reference Manual, Feb. 2010, ARM Limited, C_errata_v3, https://web.eecs.umich.edu/~prabal/teaching/eecs373-f10/readings/ARMv7-M_ARM.pdf on Dec. 16, 2014, 716 pages.
Micromint USA, Eagle interrupts Example, Jun. 20, 2010, micromint.com, downloaded from http://wiki.micromint.com/index.php/Eagle_interupts_Example on Nov. 12, 2014, pp. 1-2.
ARM Limited, ARM Procedure Call Standard for the ARM Architecture, Oct. 16, 2009, release 2.08, downloaded from https://web.eecs.umich.edu/~prabal/teaching/eecs373-fl1/readings/ARM-AAPCS-EABI-v2.08.pdf on Dec. 14, 2014, 34 pages.
English translation of Chinese First Office Action dated Dec. 19, 2016 in CN 201380049898.5, 7 pages.
English translation of Japanese Office Action dated Dec. 16, 2016 in JP 2014-556133, 3 pages.
Office Action dated Feb. 22, 2018 in co-pending U.S. Appl. No. 15/284,830, 31 pages.
ARM Ltd., Cortex-M4 Devices—Generic User Guide, Dec. 16, 2010, ARM DUI 0553A, Issue A, First release. Downloaded from http://infocenterarm.com/help/topic/com.arm.doc.dui0553a/DUI0553A cortex m4 dgug.pdf on Feb. 11, 2018 (Year: 2010), 276 pages.
Final Office Action dated Jan. 17, 2018 in co-pending U.S. Appl. No. 14/795,933, 29 pages.
Malaysian Modified Substantive Examination Report dated Mar. 30, 2018 in MY Application No. PI 2015700722, 3 pages.

* cited by examiner

ATTACK SCENARIOS

Initialise Secure Stack

SCRS - 0 - stacking callee registers can be skipped on switching from secure → less secure
1 - perform stacking of callee registers on switching from secure → less secure S - 0 - background processing was in less secure domain
1 - background processing was in secure domain

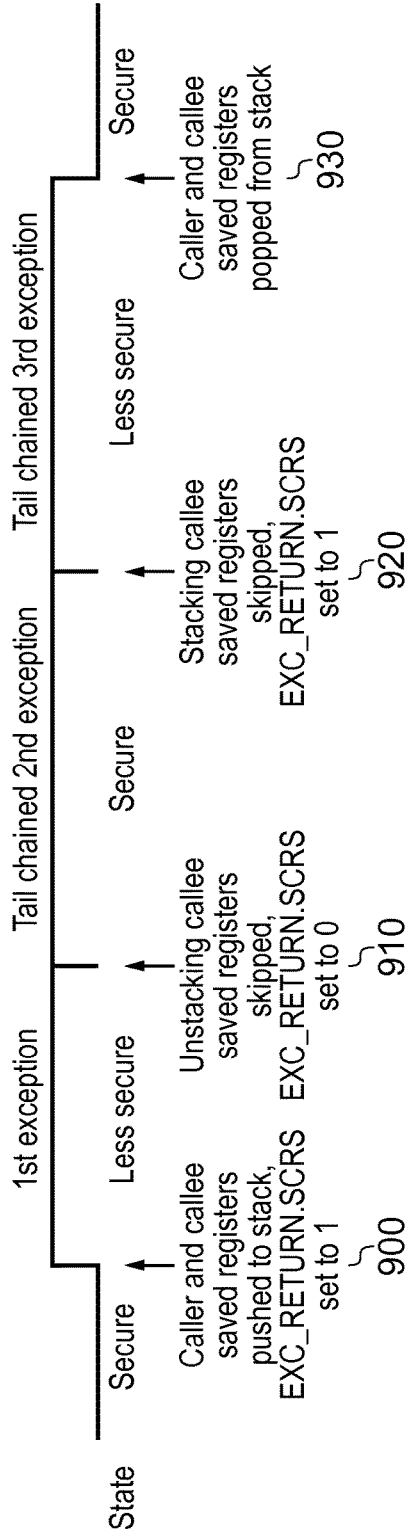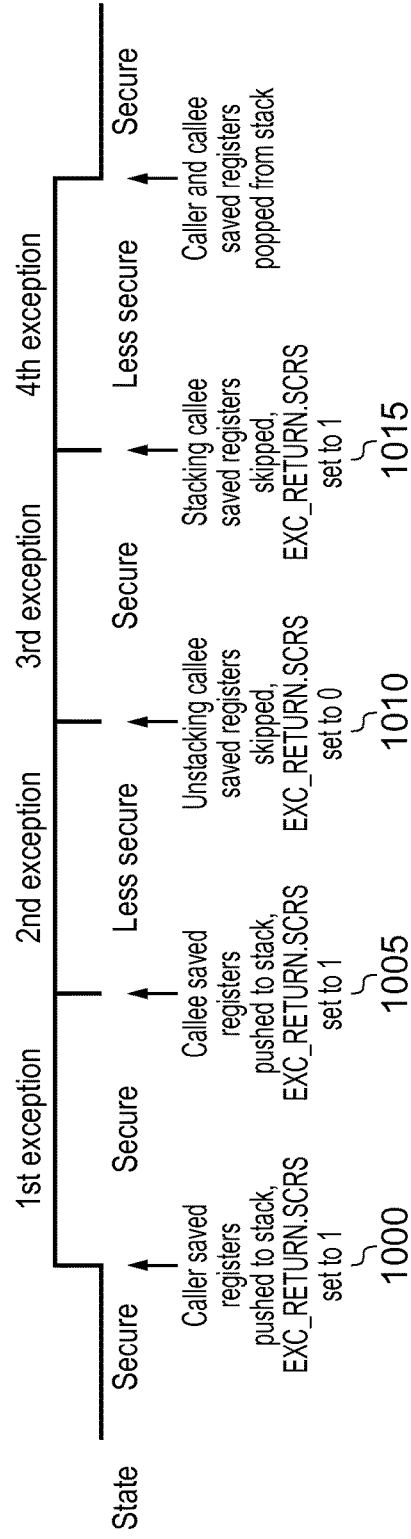

DATA PROCESSING APPARATUS AND METHOD FOR PROTECTING SECURE DATA AND PROGRAM CODE FROM NON-SECURE ACCESS WHEN SWITCHING BETWEEN SECURE AND LESS SECURE DOMAINS

CROSS-REFERENCE

This application is a continuation of U.S. application Ser. No. 13/680,352 filed Nov. 19, 2012, which is a continuation-in-part of U.S. application Ser. No. 13/368,419 filed Feb. 8, 2012, and claims priority to GB Application No. 1217531.1 filed 1 Oct. 2012, the entire contents of each of which are incorporated herein by reference in this application.

BACKGROUND

The present invention relates to the field of data processing and in particular to the processing of sensitive data and code.

Many data processing systems and architectures provide ways of isolating and protecting sensitive data and sections of code from access by unauthorised persons or processes. Although it is important to be able to provide security, there is an overhead in performance and circuit area associated with this protection.

In small systems such as microcontrollers, it is very important that these overheads are kept low, and thus some compromise between level of security and performance may need to be made.

One way of keeping data and code secure is provided by ARM® of Cambridge UK, with their Trustzone architecture where there are secure and non-secure states (also referred to as secure and non-secure domains), and an exception instruction is used to transition between the states, the exception handler protecting the security of the secure side. Although this approach provides a high degree of security, considerable software intervention in the form of the software exception handler is required to change security states which both reduces the performance of the system and increases the amount of effort required to develop an external application program interface API for the secure software as all calls must be proxied through the exception hander. Similarly exceptions that occur whilst in the secure domain that require handling in the non-secure domain also need to be proxied through a secure exception handler, this allowing the secure state to be protected before control passes to the non-secure exception handler.

U.S. Pat. No. 7,966,466 and US 2008/0250216 discloses an alternative secure system where a data store has a secure side and a non-secure side and the location within this data store of the code currently being executed determines the domain the processor is operating in, and thus the data that it is allowed to access.

Many system architectures that contain a secure state only allow one mechanism for transitioning between states (typically by use of exceptions), since this simplifies the task of protecting the security of the data and program code in the secure state. However, with the aim of improving speed and efficiency, it is also possible to provide multiple mechanisms for transitioning between the secure and less secure states. For example, the CodeGuard system developed by Microchip Technology Inc. allows both exceptions and direct function calling as mechanisms for transitioning between security states. However, the use of multiple mechanisms for transitioning between states increases the vulnerability to malicious attack, for example allowing software in the less secure state to seek to return to the secure state via a return mechanism that is of a different type to the original mechanism used to transition from the secure state into the less secure state (e.g. by using a function call return to return from an exception, or an exception return to return from a function call).

SUMMARY

Viewed from a first aspect, the present invention provides a data processing apparatus, said data processing apparatus comprising: processing circuitry configured to perform data processing operations in response to program code; a data store configured to store data, said data store comprising a plurality of regions including a secure region and a less secure region, the secure region configured to store sensitive data accessible by said processing circuitry when operating in a secure domain and not accessible by said processing circuitry when operating in a less secure domain; said data store comprising a plurality of stacks, including a secure stack in said secure region; the processing circuitry including stack access circuitry configured in response to an event requiring a transition from the secure domain to the less secure domain, to store predetermined processing state to the secure stack; if said event is a first event type, the predetermined processing state stored by the stack access circuitry comprising at least a return address which is stored at a predetermined relative location on the secure stack; if the event is a second event type, the predetermined processing state stored by the stack access circuitry comprising at least a first value which is stored at said predetermined relative location, where said first value is not a valid address for program code; and the processing circuitry further comprising fault checking circuitry configured on receipt of a first event type return from the less secure domain to the secure domain to identify a first fault condition if the data stored in said predetermined relative location is said first value.

In accordance with the present invention, multiple event types are allowed to cause a transition between the secure domain and the less secure domain. If an event requires a transition from the secure domain to the less secure domain, stack access circuitry is arranged to store certain predetermined processing state on the secure stack before the transition to the less secure domain takes place. What is stored on the secure stack as that predetermined processing state will be dependent on the event type, and is chosen to ensure that if the less secure program code attempts to return to the secure domain using a return associated with a different event type, then this will be detected.

In particular, if the event causing the transition from the secure domain to the less secure domain is a first event type, the predetermined processing state that the stack access circuitry stores on the secure stack comprises at least a return address, and that return address is stored at a predetermined relative location on the secure stack (for example at a bottom entry of a stack frame used by the stack access circuitry to store the predetermined processing state, or at some predetermined offset relative to that bottom entry).

Similarly, if the event is a second event type, the predetermined processing state stored by the stack access circuitry in that event comprises at least a first value that is stored at that predetermined relative location. The first value is such that it is not a valid address for program code.

If a first event type return is subsequently received from the less secure domain to the secure domain, fault checking circuitry will retrieve the data from the predetermined relative location. Since the first event type return is being used, then it should be the case that that predetermined relative location stores the return address previously stored by the stack access circuitry. However, if instead it stores the first value, this indicates a scenario where the less secure program code is seeking to return via the first event type return despite the fact that the original transition from the secure domain to the less secure domain was due to the second event type, and in this situation the fault checking circuitry will identify a first fault condition, hence flagging such activity. Hence, this mechanism prevents the malicious user from using many kinds of attack, including seeking to indirectly perform an arbitrary branch into secure code by using a different event type return into the secure domain than should be used given the event type that previously caused the transition from the secure domain into the less secure domain.

The first event type and second event type can take a variety of forms. However, in one embodiment the first event type is a function call and the second event type is an exception. Hence, the above described mechanism will ensure that a malicious attack that attempts to perform a function call return into the secure domain following an exception branch from the secure domain into the less secure domain will be prevented.

In one embodiment, if the event is said first event type, the processing circuitry is configured to provide a dummy return address to the program code in said less secure domain that is used to process said first event type, the dummy return address not being a valid address for program code. Then, on completing the program code in the less secure domain that is used to process said first event type, the dummy return address causes said return address (i.e. the actual return address) to be fetched from the secure stack. In particular, on seeing the dummy return address, the stack access circuitry is arranged to load from the secure stack the data held at the predetermined relative location, and the fault checking circuitry can hence check whether that data specifies the expected return address, or is instead the earlier-mentioned first value indicating a fault condition.

In one embodiment, the dummy return address can also be used to ensure that when the event causes a transition from the secure domain to the less secure domain, the subsequent return (using that dummy return address) will cause a transition back to the secure domain, hence allowing the fault checking circuitry to perform the required checks.

In one embodiment, if the event is an exception, the predetermined processing state stored by the stack access circuitry includes a predetermined signature, and the fault checking circuitry is configured on receipt of an exception return from the less secure domain to the secure domain to identify a second fault condition if the predetermined signature is not present within the predetermined processing state stored by the stack access circuitry.

By such an approach, if an exception return is issued from the less secure domain following a transition from the secure domain into the less secure domain that took place via a function call, then the predetermined processing state that had been stored on the secure stack by the stack access circuitry will not include that predetermined signature, and accordingly this will indicate an attempted attack using an incorrect return.

The predetermined signature can be placed at any suitable location within the secure stack and take any desired form. However, in one particularly efficient embodiment, the predetermined signature forms the earlier-mentioned first value that is stored at the predetermined relative location. As a result, that single predetermined signature enables both the first and second fault conditions to be detectable by the fault checking circuitry.

In one embodiment, if the event is a function call, the processing circuitry is configured to provide a dummy function call return address to the program code in said less secure domain that is identified by said function call, the dummy function call return address being selected from a range of addresses that are not valid addresses for program code, and said predetermined signature has a different value to said dummy function call return address. By ensuring that the predetermined signature has a different value to the dummy function call return address, this simplifies the implementation of the processing circuitry, since the required action to be performed can be determined solely from the value being analysed, and is independent of whether the value originated from a function call return or was read from the stack.

Alternatively, or in addition, if the event is an exception, the processing circuitry is configured to provide a dummy exception return address to the program code in said less secure domain that is used to process said exception, the dummy exception return address being selected from a range of addresses that are not valid addresses for program code, and said predetermined signature has a different value to said dummy exception return address. Again, implementation efficiencies can be realised by making the predetermined signature different to the dummy exception return address.

In one embodiment, the predetermined relative location is a predetermined location within a stack frame used by the stack access circuitry. Whilst the location can in principle be any location within the stack frame, in one embodiment the predetermined location is a bottom location of the stack frame, i.e. the location pointed to by the stack pointer.

There are a number of ways in which the first fault condition can be processed once it has been raised. However, in one embodiment, the processing circuitry is responsive to said first fault condition to execute fault handling program code within said secure domain. By ensuring that the fault handling program code is executed within the secure domain, this prevents an attacker in the less secure domain from regaining control, and accordingly from retrying the attack.

As an alternative mechanism for thwarting any retry of the attack, the data processing apparatus may be arranged such that the stack pointer value is not adjusted if said first fault condition is identified, such that replay of the first event type return will also cause said first fault condition to be identified. Accordingly, by not adjusting the stack pointer, the attacker cannot merely consume the last location of the secure stack and then retry the attack in order to enter at a different place within the secure stack.

In one embodiment, both of the above mechanisms can be used to provide robustness against retrying of the attack from the less secure domain. Whilst the above mechanisms have been described in relation to processing of the first fault condition, they may also be applied equally to processing of the second fault condition.

In one embodiment, another scenario that may give rise to a potential attack from the non-secure domain arises following initialisation of the secure stack. At this point, the secure stack will be empty. If at that time, the program code being executed is in the less secure domain, it is possible that program code may attempt to return into the secure domain. Such a return should be prevented, since there is no original transition from the secure domain to the less secure domain to be legitimately returned from. In one embodiment, the data processing apparatus provides protection from such a scenario by ensuring that, on initialisation of the secure stack, a second value is stored at said predetermined relative location on the secure stack, said second value being different to said first value and also not being a valid address for program code. The fault checking circuitry is then configured on receipt of a return from the less secure domain to the secure domain to identify a third fault condition if the data stored in said predetermined relative location is said second value. In accordance with this embodiment, the return from the less secure domain will cause the fault checking circuitry to load the data stored at the predetermined relative location on the secure stack, and in this scenario that data will identify the above-mentioned second value, causing the third fault condition to be detected. Handling of the third fault condition can take place in the same way as described earlier for the first and second fault conditions, ensuring that any retry of the attack is also prevented.

In one embodiment, the third fault condition is the same as the first fault condition, and accordingly the same fault handling code is used for both of these fault conditions. Accordingly, in such embodiments, it is not necessary for the fault checking circuitry to distinguish between the first and second values.

In one embodiment, the data processing apparatus further comprises a plurality of registers, and if the event is an exception, the predetermined processing state stored by the stack access circuitry further comprises the content of at least a subset of said registers. In one particular embodiment, the number of registers whose contents are stored by the stack access circuitry will be dependent on whether the exception is to be handled by the secure domain or the less secure domain.

In one embodiment, the plurality of stacks further comprises a less secure stack in said less secure region, and the processing circuitry is configured to determine which stack to store data to, or load data from, based on the domain in which background processing was being performed. In the present application, the term "background processing" is used to indicate the processing which was interrupted by the function call or the exception. For at least exceptions, it is possible for higher priority exceptions to interrupt lower priority exceptions already in the process of being handled. Hence, if an exception handling routine is itself interrupted by a higher priority exception (referred to herein as a pre-empting exception), then the exception handling routine that was interrupted may itself become the "background processing" for the pre-empting exception.

Viewed from a second aspect, the present invention provides a method of processing data on a data processing apparatus, said data processing apparatus comprising processing circuitry for performing data processing operations in response to program code, and a data store for storing data, said data store comprising a plurality of regions including a secure region and a less secure region, the secure region configured to store sensitive data accessible by said processing circuitry when operating in a secure domain and not accessible by said processing circuitry when operating in a less secure domain, said data store comprising a plurality of stacks, including a secure stack in said secure region, and said method comprising: storing predetermined processing state to the secure stack in response to an event requiring a transition from the secure domain to the less secure domain; if said event is a first event type, storing as the predetermined processing state at least a return address which is stored at a predetermined relative location on the secure stack; if the event is a second event type, storing as the predetermined processing state at least a first value which is stored at said predetermined relative location, where said first value is not a valid address for program code; and on receipt of a first event type return from the less secure domain to the secure domain, identifying a first fault condition if the data stored in said predetermined relative location is said first value.

Viewed from a third aspect, the present invention provides a data processing apparatus, said data processing apparatus comprising: processing means for performing data processing operations in response to program code; data store means for storing data, said data store means comprising a plurality of regions including a secure region and a less secure region, the secure region configured to store sensitive data accessible by said processing means when operating in a secure domain and not accessible by said processing means when operating in a less secure domain; said data store means comprising a plurality of stacks, including a secure stack in said secure region; the processing means including stack access means for storing predetermined processing state to the secure stack in response to an event requiring a transition from the secure domain to the less secure domain; if said event is a first event type, the predetermined processing state stored by the stack access means comprising at least a return address which is stored at a predetermined relative location on the secure stack; if the event is a second event type, the predetermined processing state stored by the stack access means comprising at least a first value which is stored at said predetermined relative location, where said first value is not a valid address for program code; and the processing means further comprising fault checking means, responsive to receipt of a first event type return from the less secure domain to the secure domain, for identifying a first fault condition if the data stored in said predetermined relative location is said first value.

BRIEF DESCRIPTION OF THE DRAWINGS

The present invention will be described further, by way of example only, with reference to embodiments thereof as illustrated in the accompanying drawings, in which:

FIGS. 15 and 16 show examples in which unnecessary state saving and restoring operations can be avoided using the status information shown in FIG. 10;

DESCRIPTION OF EXAMPLE EMBODIMENTS

Figure 1:
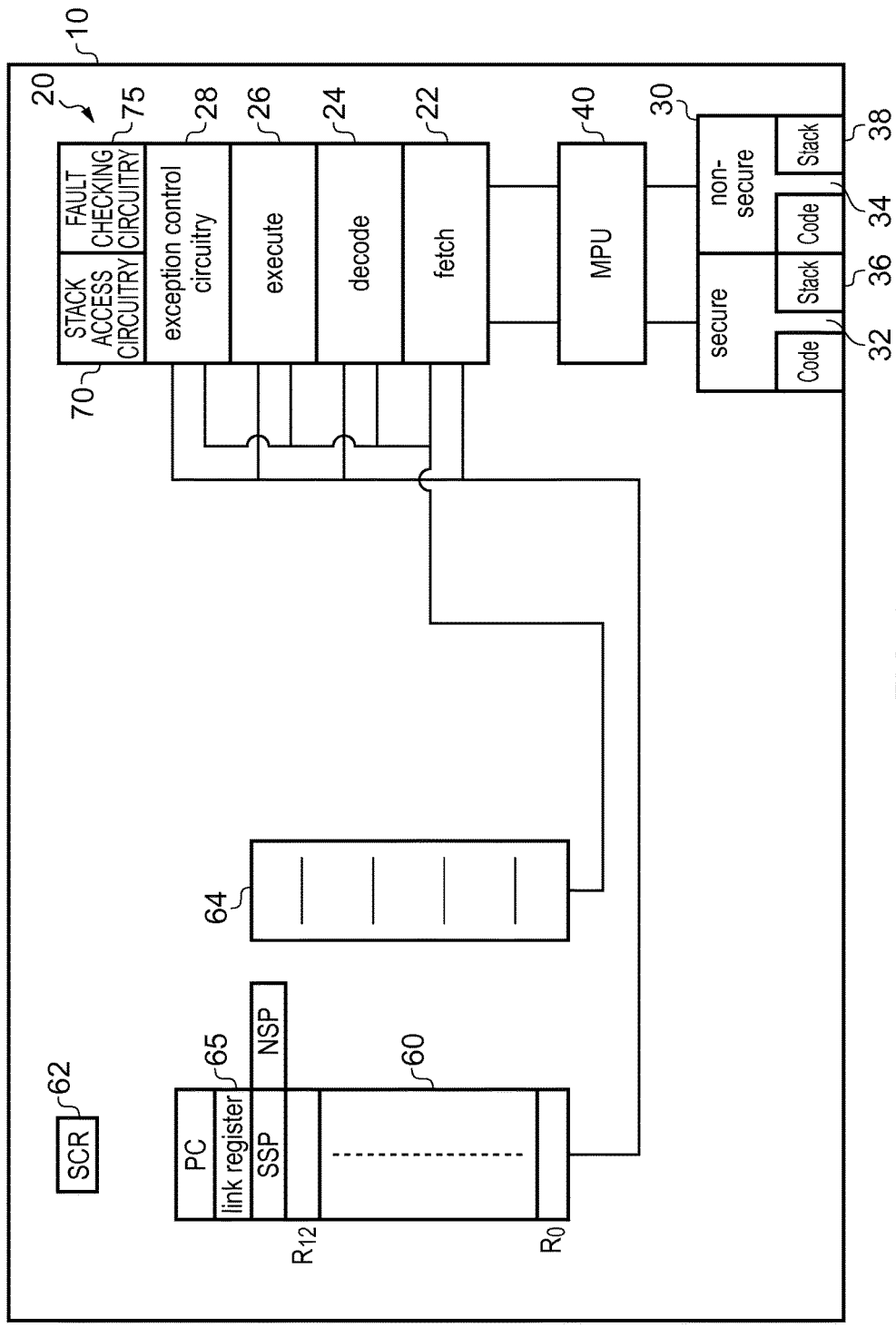
FIG. 1 shows a data processing apparatus according to one embodiment, having a data store with secure and non-secure regions.

FIG. 1 shows a data processing apparatus 10 which may for example be a microcontroller. It comprises processing circuitry 20 for processing instructions and a data store 30 for storing data that is processed by the processing circuitry 20 and also for storing the program code that the processing circuitry 20 executes.

Data store 30 has two regions of different security, a secure region 32 and a non-secure region 34 (also referred to herein as a less secure region). Data stored in the secure region 32 is not accessible to code that is stored in the non-secure region 34 when it is executing.

Data processing apparatus 10 also has a memory protection unit MPU 40 which controls access to the secure 32 and the non-secure 34 regions. Although this control may be performed through a memory protection unit, it may in other embodiments be done in a more distributed fashion by circuitry within the processing apparatus that monitors the region code that is currently being executed is stored in, and controls access to the different regions of the memory in dependence upon this.

In this embodiment, the security of the domain that the processing circuitry 20 is executing in may be determined from the region that the code currently being executed is stored in. Thus, secure program code stored in secure data store 32 is executed in the secure domain and uses secure stack 36 to store data values in. Similarly non-secure code stored in non-secure data store 34 is executed in the non-secure domain and uses non-secure stack 38 for storing data values during execution. Other techniques for determining the current domain of operation are also possible, e.g. based on a target domain value identifying which domain the processor should operate in following a control flow altering instruction.

Processing circuitry 20 has fetch circuitry 22 for fetching instructions to be executed. It also has decode circuitry 24 for decoding these instructions and execution circuitry 26 for executing them. Instructions to be executed are fetched by fetch circuitry 22 from data store 30 via the memory protection unit MPU 40. The instructions and data are retrieved via MPU 40 which controls the access to the secure and the non-secure regions and isolates the secure data from the non-secure side.

In this embodiment there is a register bank 60 which has general purpose registers which are used during data processing. These general purpose registers have a program counter PC which indicates which instruction is the next to be executed, and a stack pointer SP which indicates at which point in the stack the next data access should be made. In this embodiment, as there is a stack in the secure side and a stack in the non-secure side, there is a secure stack pointer SSP and a non-secure stack pointer NSP, but only one of these is directly visible to the program being executed at any one time. It should be noted that in some embodiments there may be plural stack pointers for each stack but again only one will be visible at any one time. There are also general purpose registers in register bank 60 for storing data values that are being processed by the processing circuitry 20. In this embodiment these are marked as R0 to R12.

Register bank 60 also comprises a link register 65 that may be used to store a return value when an exception is taken or a function is called. The return value allows the system to determine whether a return is an exception return or a function return, and to determine what processing is required on returning from the exception or function. Different kinds of return values may be used, including a function return address indicating the address of a program instruction to be processed following completion of a function, a dummy function return value indicating a function return for which the actual function address has been stored to the secure stack to hide it from the less secure domain, and an exception return (EXC_RETURN) value which indicates an exception return and can include information, such as an indication of the security level of the domain that the background processing was processed in, which can enable the processor to determine how to handle the exception return, e.g. which stack to access when restoring state and how many registers need to be loaded. The different forms of return value will be described later.

FIG. 1 also shows an additional register bank 64 which has additional special purpose registers such as floating point registers. In one embodiment, a value can be set in the secure configuration register (SCR) 62 to identify whether any of the registers in the additional register bank 64 can store secure data, and if so those registers will be considered to form part of a set of registers (along with the registers of the register bank 60) that needs to be managed when controlling a transition from the secure domain to the less secure domain, and vice versa.

There are a number of mechanisms which may cause a transition from the secure domain to the less secure domain, and vice versa. In accordance with the described embodiments, one allowed mechanism for transitioning between the security domains is a function calling mechanism, whereby a function call can be issued to cause execution of the current software routine to be temporarily halted in order to enable a transition to another software routine identified by the function call, this other software routine to be executed in either the secure domain or the less secure domain dependent on where that other software routine is stored within the data store 30. Once that other software routine has been executed, then a function call return is performed in order to return back to the execution of the original software routine that was temporarily halted. Whilst some function calls will identify a target software routine that is to be executed in the same domain as the current software routine, in other instances the target software routine may need execution in a different domain to the domain in which the current software routine is executing.

In accordance with the described embodiments, another mechanism which can be used to transition between the security domains is an exception mechanism. In accordance with this mechanism, on occurrence of an exception, execution of the current software routine will be temporarily halted, and instead execution will branch to an exception handling routine used to process the exception, the exception handling routine used being dependent on the type of exception occurring. Once the exception handling routine has been executed, an exception return will then be used to return back to the original software routine that was temporarily halted as a result of the exception occurring.

Exception control circuitry 28 is provided to control the taking of exceptions, and where these exceptions result in a transition from a more secure to a less secure domain the set of registers that may store sensitive data will be cleared prior to the taking of the exception to avoid data stored in these registers being available to the less secure side. The state stored in some or all of these registers will be stored on the secure stack under the control of the stack access circuitry 70, such that on return from the exception that state can be restored. For the purposes of exception handling, the stack access circuitry 70 used to control storing of register contents to the appropriate stack can be considered to form part of the exception control circuitry 28. However, more generally, there is also some stack access circuitry 70 associated with storing predetermined processing state to the secure stack on occurrence of a function call that requires a transition from the secure domain to the less secure domain, and accordingly the stack access circuitry 70 is identified separately to the exception control circuitry 28 within FIG. 1.

Further, as shown in FIG. 1, fault checking circuitry 75 is provided for detecting situations where software in the less secure domain is seeking to return to the secure domain via a return mechanism that is of a different type to the original mechanism used to transition from the secure domain into the less secure domain (for example by using a function call return to return from an exception, or an exception return to return from a function call). Whilst part of the fault checking circuitry 75 may be considered to be contained within the exception control circuitry 28 (namely the part that is responsible for checking exception returns), other parts of the fault checking circuitry 75 may be distributed elsewhere within the hardware of the processing circuitry. For example, the part that is responsible for checking function call returns may in one embodiment be associated with the fetch circuitry 22. The operation of the fault checking circuitry 75 will be discussed in more detail later.

Whilst in FIG. 1 the data store 30 contains a single secure region and a single less secure region, the techniques described herein are equally applicable to different implementations comprising more than two different security regions.

Also, while FIG. 1 shows the exception control circuitry 28 and stack access circuitry 70 as being separate from other parts of the processing circuitry 20 such as the execution stage 26, in practice the exception control circuitry 28 and stack access circuitry 70 may at least partly reuse some elements of the processing circuitry 20 to control processing of exceptions and stack operations.

Figure 2:
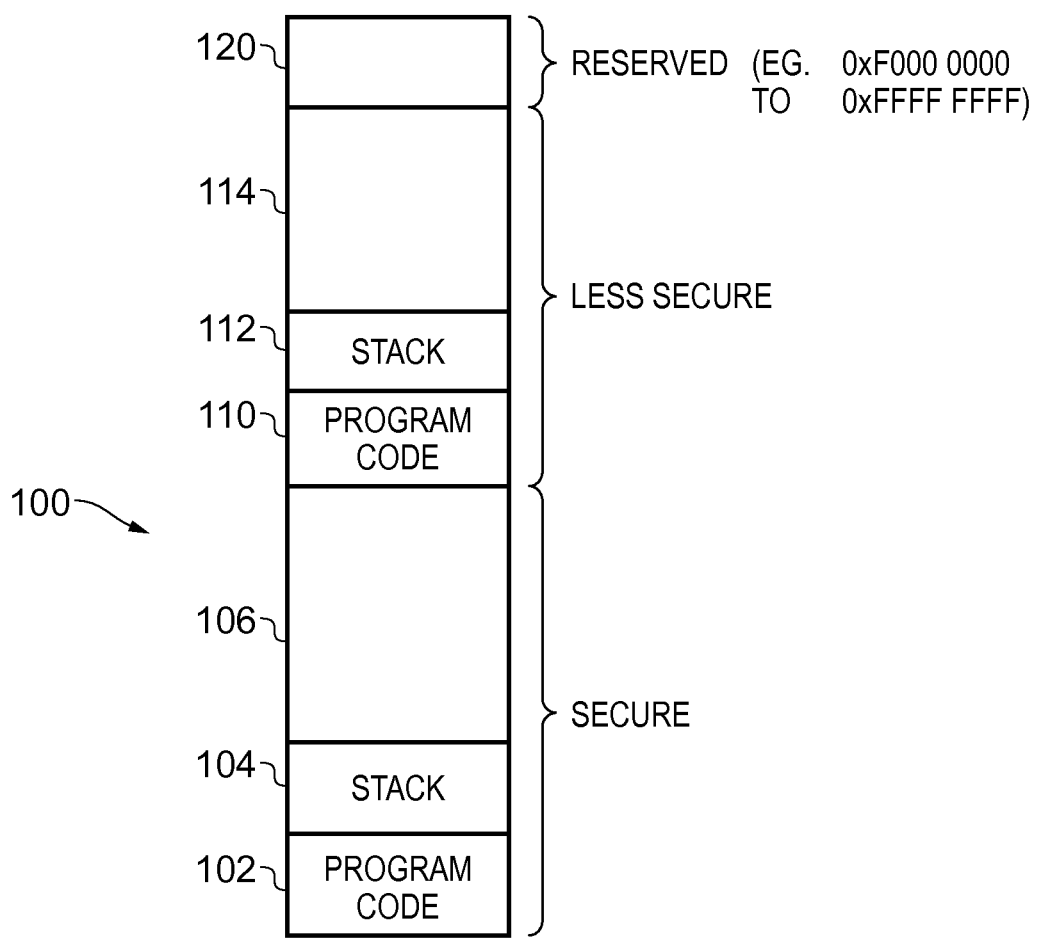
FIG. 2 schematically illustrates the memory address space in accordance with one embodiment.

FIG. 2 schematically illustrates the memory address space that may be used in one embodiment. The memory address space 100 will be partitioned to form one or more secure regions and one or more less secure regions. For simplicity, in FIG. 2 it is assumed that there is a single secure region and a single less secure region. A portion of the secure address space 102 will be set aside for the storage of program code to be executed in the secure domain, whilst another portion of the secure address space 104 will be allocated to the secure stack 36. The remainder of the secure address space 106 will be used for a variety of purposes, for example as a memory heap, as free space allocated during execution, etc. The less secure address space will also be partitioned in a similar way, thus providing a portion 110 for the storage of program code to be executed in the less secure domain, a portion 112 allocated to the less secure stack 38, and a remaining portion 114.

In accordance with the described embodiments, the memory address space also includes a reserved region 120, with any addresses in this region not being valid addresses for program code. As will be discussed in more detail hereafter, some of these reserved addresses are used to provide desired functionality for the described embodiments.

Figure 3A:
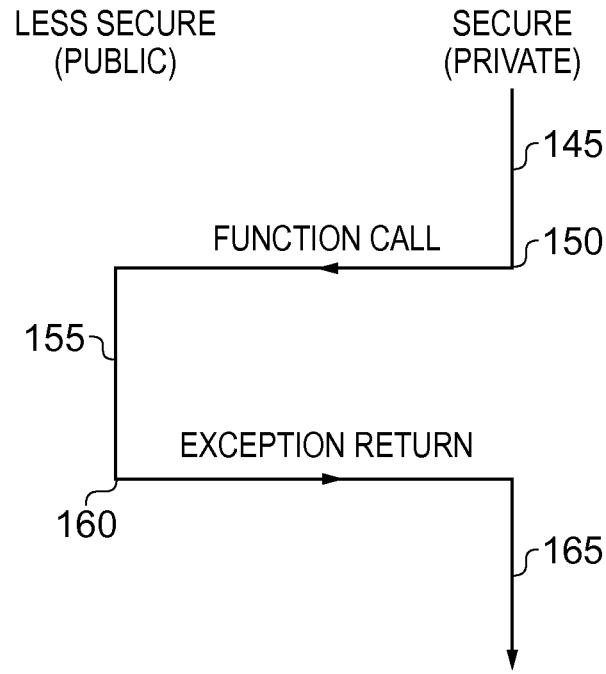
FIGS. 3A and 3B illustrate two different attack scenarios that the techniques of the described embodiments aim to provide protection against.
Figure 3B:
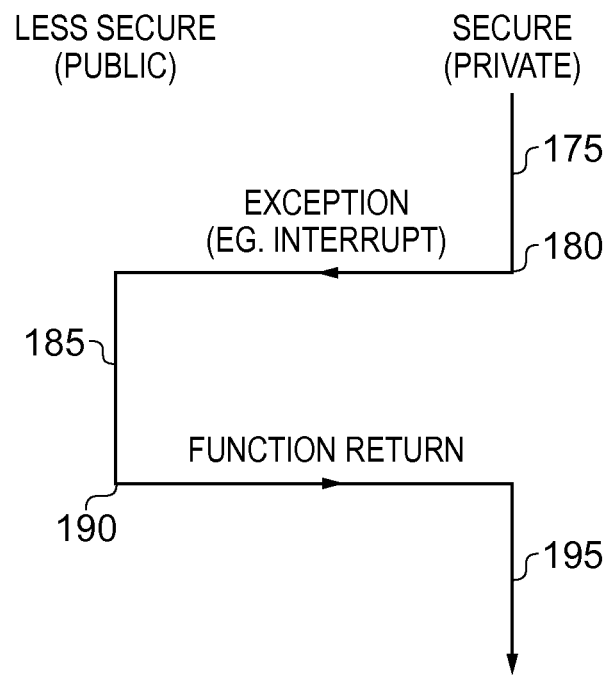

With the aim of improving speed and efficiency, the above described embodiments provide two mechanisms for transitioning between the secure and less secure domains, namely a function calling mechanism and an exception mechanism. However, the use of multiple domain transition mechanisms increases the vulnerability to malicious attack, for example allowing software in the less secure domain to seek to return to the secure domain via a return mechanism that is of a different type to the original mechanism used to transition from the secure domain into the less secure domain. Two specific attack scenarios are illustrated in FIGS. 3A and 3B. As shown in FIG. 3A, it is assumed that some secure code is executing at point 145, and at point 150 a function call is made to a function residing in the less secure domain. That function is then executed at point 155, but at point 160 the less secure software attempts to arbitrary branch into the secure code by using an exception return mechanism.

Similarly, in FIG. 3B, it is assumed that some secure code is executing at point 175, and at point 180 an exception (for example an interrupt) occurs causing a branch to an exception handling routine in the less secure domain. This exception handling routine is executed at point 185, but subsequently at point 190 the software in the less secure domain attempts to make a function return to the secure domain.

Both of the above attack scenarios need to be prevented if the security of the system is to be maintained, since if such scenarios were allowed to take place, this would allow less secure software to attempt to make an arbitrary branch into secure code, which could provide a mechanism for gaining access to secure data.

Figure 4A:
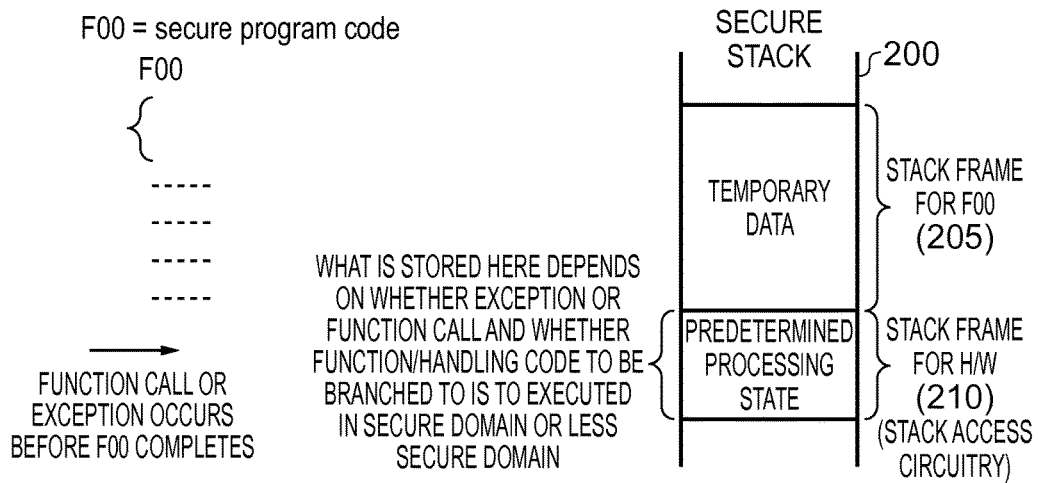
FIG. 4A schematically illustrates the storing of predetermined processing state on the secure stack upon receipt of a function call or an exception in accordance with one embodiment.

In order to protect against such attacks, the stack access circuitry 70 is arranged to store predetermined processing state onto a stack frame of the secure stack when a function call or an exception occurs that causes a transition from the secure domain to the less secure domain, as will be discussed in more detail with reference to FIGS. 4A and 4B. In FIG. 4A, it is assumed that a secure program FOO is currently executing in the secure domain, and that a function call or exception then occurs before FOO completes. Prior to the occurrence of the function call or the exception, FOO will typically use an allocated stack frame 205 on the secure stack 200 in order to store temporary data used by FOO. On occurrence of the function call or the exception, a separate stack frame 210 will then be allocated for the stack access circuitry 70, and the stack access circuitry will then store predetermined processing state within that stack frame 210 prior to branching to the required software routine identified by the function call, or to the exception handling routine required to handle the exception.

Figure 4B:
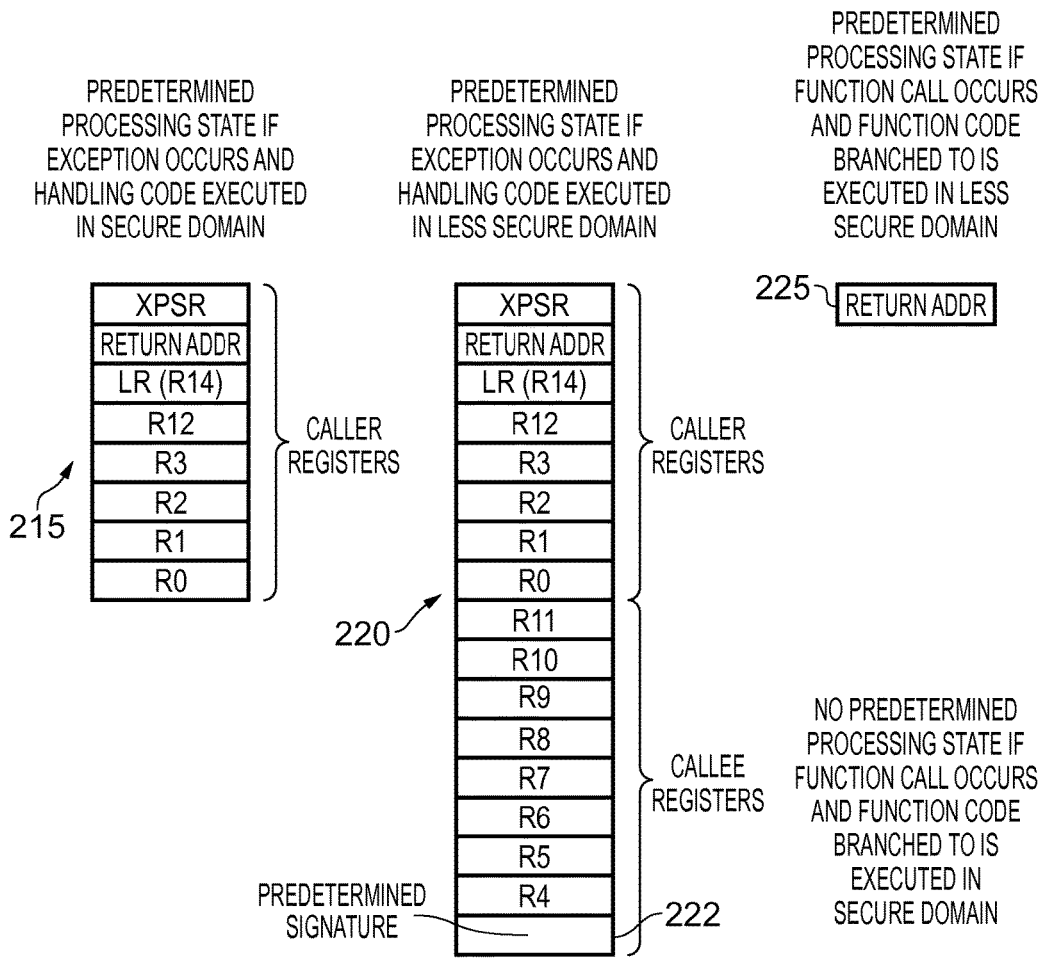
FIG. 4B illustrates the form of that predetermined processing state for various scenarios.

Considering first the situation where an exception occurs, then if the exception handling routine is to be executed within the secure domain, the predetermined processing state stored by the stack access circuitry within the stack frame 210 includes the contents of the registers 215 identified in FIG. 4B. These registers are referred to herein as the "caller" registers, and those are the registers that the stack access circuitry 70 (or exception control circuitry 28) will always take responsibility for state saving onto the stack, irrespective of the domain in which the exception handling routine is to execute. By default, the exception handling routine would then have responsibility for state saving the remainder of the registers (referred to herein as the "callee" registers). In particular, the exception handling routine would then save the state of the callee registers onto the stack associated with the domain in which the exception handling routine is executing, prior to reusing the registers in the body of the exception handling routine. Further, once the exception handling routine is completed, the exception handling routine would then be responsible for restoring the state of those callee registers (typically by copying them from the stack back into the relevant registers) prior to issuing an exception return.

However, in accordance with the described embodiments, in situations where the exception will require a transition from the secure domain to the less secure domain, and previous background processing was in the secure domain, the stack access circuitry 70 additionally takes responsibility for state saving the callee registers within the stack frame 210 prior to causing the processing circuitry to transition to execution of the exception handling routine. Accordingly, as shown in FIG. 4B, in this situation, the predetermined processing state stored within the stack frame 210 takes the form 220. It will be appreciated that the caller and callee registers specifically identified in FIG. 4B are purely an example of how the caller and callee registers may be partitioned, and exactly which registers are considered to be caller registers or callee registers will vary dependent on implementation.

As also shown in FIG. 4B, in the situation where the exception handling routine is in the less secure domain, thus requiring a transition from the secure to the less secure domain, the stack access circuitry is also arranged to store a predetermined signature 222 at a predetermined relative location within the stack frame 210, in the embodiment shown this predetermined relative location being the bottom location within the stack frame. This predetermined signature can take a variety of forms, but in one embodiment is chosen to have a value which does not correspond to a valid address for program code. In one embodiment, the predetermined signature is chosen to have one of the address values 120 in the reserved portion of the memory address space. In one particular embodiment, the predetermined signature has the value 0xF0A5125A.

Typically, on occurrence of a function call, the stack access circuitry 70 would normally not store any predetermined processing state within the stack frame 210. Accordingly, if the function call identifies target code that is still within the secure domain, no predetermined processing state is stored. However, if the function call identifies target code within the less secure domain, then the stack access circuitry 70 is arranged to store within the stack frame 210 the return address 225 that will be required in order to resume execution of FOO once the function call has been completed. This return address 225 is stored at the same predetermined relative location as the predetermined signature 222 is stored at in the event of an exception occurring which requires a transition to the less secure domain, i.e. the bottom location within the stack frame.

In place of the actual return address 225 stored within the secure stack, the target code within the less secure domain is provided with a dummy function call return address that is not in fact a valid address for program code. In one embodiment, that dummy function call return address is chosen from one of the reserved addresses 120, and is further chosen to have a different value to the earlier-mentioned predetermined signature 222.

Figure 5:
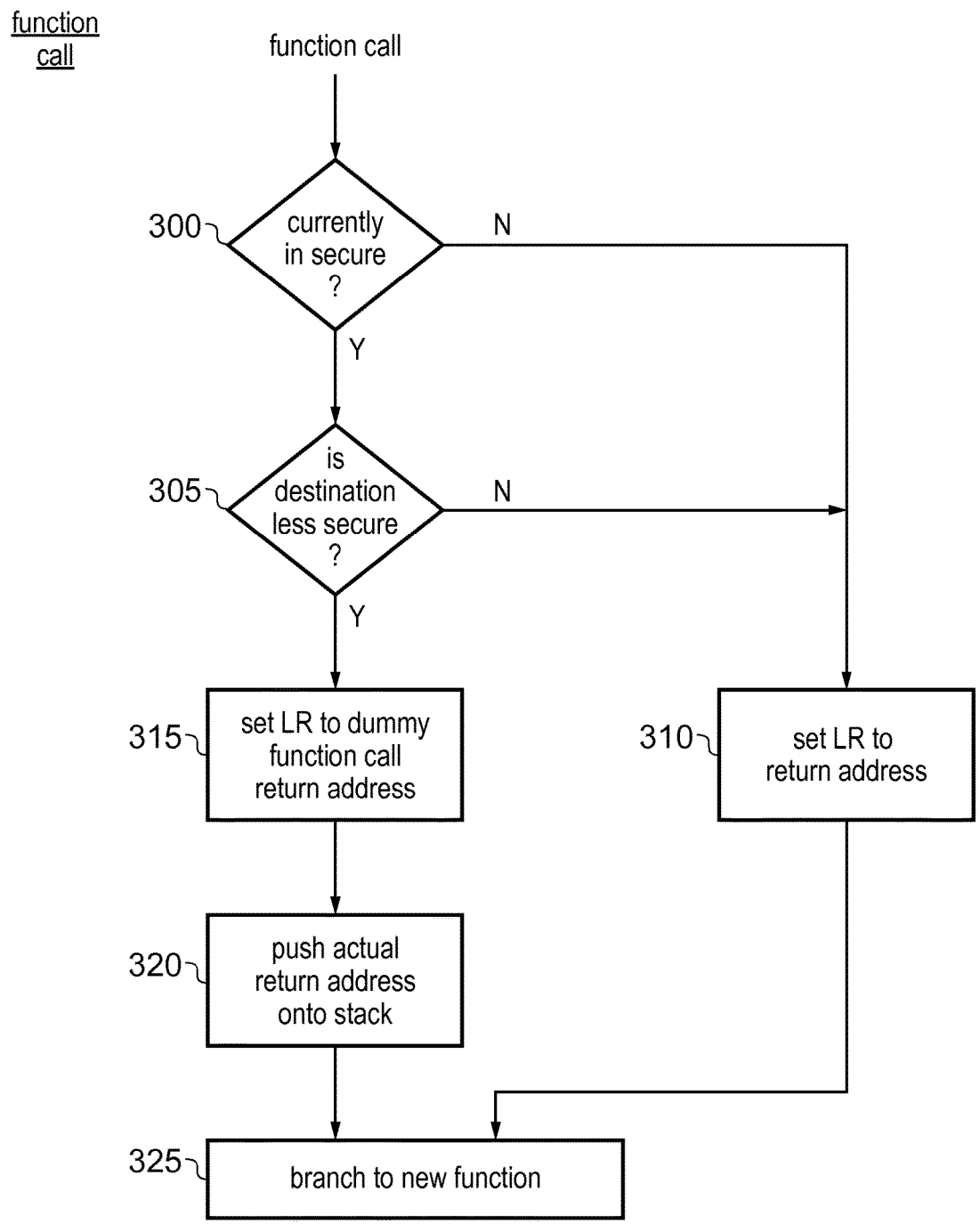
FIG. 5 is a flow diagram illustrating the operation of the processing circuitry in one embodiment upon receipt of a function call.

On occurrence of a function call, the software may still perform state saving of register state, even if state saving is not required by the hardware according to the stack frames shown in FIG. 4B. The division of the registers into caller and callee registers is useful for such function calls, because it allows both the software executed before the function call (the caller software) and the software executed after the function call (the callee software) to influence which registers are subject to state saving. For example, if the caller software is aware that it has not used certain caller registers, or has finished using data in some caller registers, then the values in those registers would not need to be maintained after the function call and so these registers do not need to be subject to state saving. Similarly, if the callee software will not be using certain callee registers then it does not have to perform state saving for these registers. Hence, allowing both the caller and callee software to influence selection of registers for state saving enables a performance improvement by reducing the amount of state saving when appropriate. In comparison, if only the caller software or only the callee software had responsibility for state saving, then some registers might be saved unnecessarily just in case the other software requires that register to be saved. FIG. 5 is a flow diagram illustrating the steps performed by the processing circuitry on occurrence of a function call, in accordance with one embodiment. At step 300, it is determined whether the currently executing code is being executed in the secure domain. If not, then the process proceeds directly to step 310, where the link register (LR) is set equal to the return address. Thereafter, the process proceeds to step 325, where a branch is performed to the new function (i.e. the program code identified as a target for the function call). Since the return address has been set within the link register, when the new function has completed, the correct return address can be specified within the function call return.

If at step 300 it is determined that the currently executing code is being executed in the secure domain, it is then determined at step 305 whether the new function that is the destination for the function call is to be executed in the less secure domain. There are a number of ways in which this can be determined, but in one embodiment this is achieved simply by determining whether the target address for the function call is an address associated with the secure memory region or the less secure memory region. If it is associated with the less secure memory region, this indicates that the destination for the function call is in the less secure domain. If the destination for the function call is not in the less secure domain, then again the process proceeds to step 310.

However, if the destination for the function call is in the less secure domain, then this indicates the requirement for a transition from the secure domain to the less secure domain, and at this point the process proceeds to step 315, where the link register is set to a dummy function call return address as discussed earlier. In addition, at step 320, the actual return address is pushed onto the secure stack by the stack access circuitry 70. Thereafter, the process proceeds to step 325, where a branch is performed to the new function that is the target of the function call.

As well as the hardware operations shown in FIG. 5, the software executing before the function call may also perform state saving of the data from the registers, and the software executing after the function call may also perform state saving of the data from the callee registers.

Figure 6:
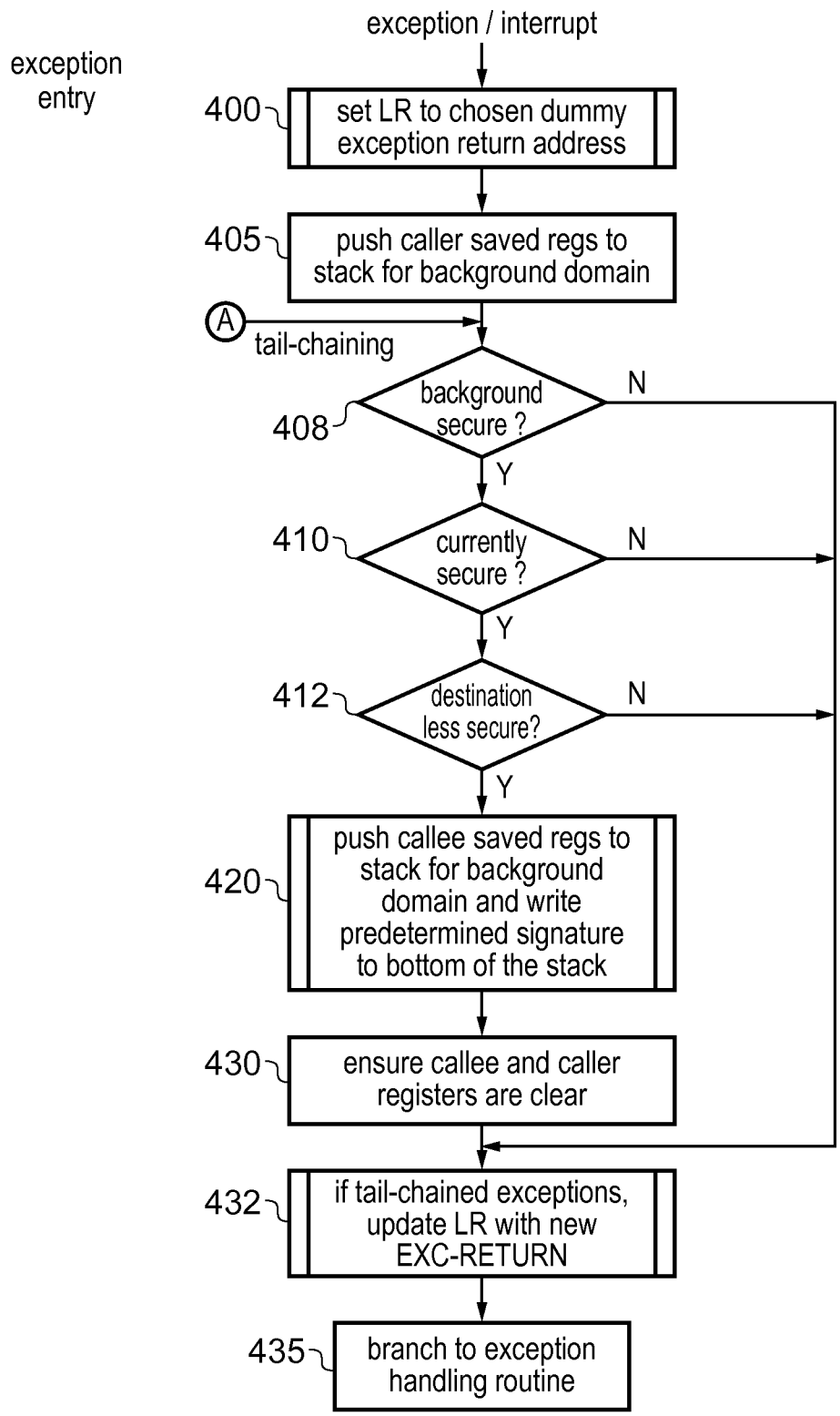
FIG. 6 is a flow diagram illustrating the operation of the processing circuitry in one embodiment upon receipt of an exception.

FIG. 6 is a flow diagram illustrating the operation of the processing circuitry on occurrence of an exception (one example of an exception being an interrupt). At step 400, the link register is set to a chosen dummy exception return address, in one embodiment there being multiple different dummy exception return addresses that can be chosen. In one embodiment, each of the possible dummy exception return addresses will be addresses that are not valid addresses for program code. More details of step 400 will be described later. Thereafter, at step 405, the caller saved registers are pushed onto the stack for the background processing domain, i.e. the domain in which the background code was being executed in.

Thereafter, at step 408 it is determined whether the background processing was in the secure domain, and if not the process processed directly to step 432. As shall be described below, whether the background processing was in the secure domain can be determined based on the exception return value placed in the link register 65. If the background processing was in the secure domain, then at step 410, it is determined whether the currently executing code is being executed in the secure domain, and if not the process again proceeds directly to step 432. If however it is determined at step 410 that the currently executing code (which may be the background processing or may be an earlier tail-chained exception) is being executed in the secure domain, then it is determined at step 412 whether the destination is in the less secure domain, i.e. whether the exception handling code required to process the exception will be executed in the less secure domain. If not, then again the process proceeds directly to step 432. However, if the destination is in the less secure domain, then this indicates a situation where there will be a transition from the secure domain to the less secure domain where the background processing was in the secure domain. Accordingly, the process proceeds to step 420, where the callee saved registers are pushed onto the stack for the background domain, and the earlier-mentioned predetermined signature is written to the bottom of the stack frame. The stack associated with the background processing can be determined from the exception return value placed in the link register 65. More details of this step will be provided later.

At step 430 the exception control circuitry 28 ensures that all of the registers are cleared. In one example, all the registers may be cleared at step 430. It is possible in an alternative embodiment for the registers to be cleared as they are pushed onto the stack, and accordingly the caller registers may be cleared during step 405 and the callee registers may be cleared during step 420 or 430.

Following step 430, or if any of the conditions checked at steps 408, 410 and 412 did not occur, then the process then proceeds to step 432. If the exception entry is to a tail-chained exception, then the link register 65 is updated with a new exception return value. This step will be discussed in more detail with respect to FIG. 12B below.

At step 435, the processing branches to the exception handling routine.

The exception handling routine may then perform state saving of the callee registers. In one embodiment, the exception handling routine may always perform state saving of the callee registers, even in the case where the data in the callee registers has already been pushed to the stack at step 420 and cleared (in this case, the hardware would have stored the data from the callee registers to the secure stack while the software would be storing the cleared values from the callee registers to the less secure stack). Alternatively, the exception handling routine may be able to detect whether the state saving of the callee registers has already been performed and if so may omit the state saving of the callee registers.

Figure 7:
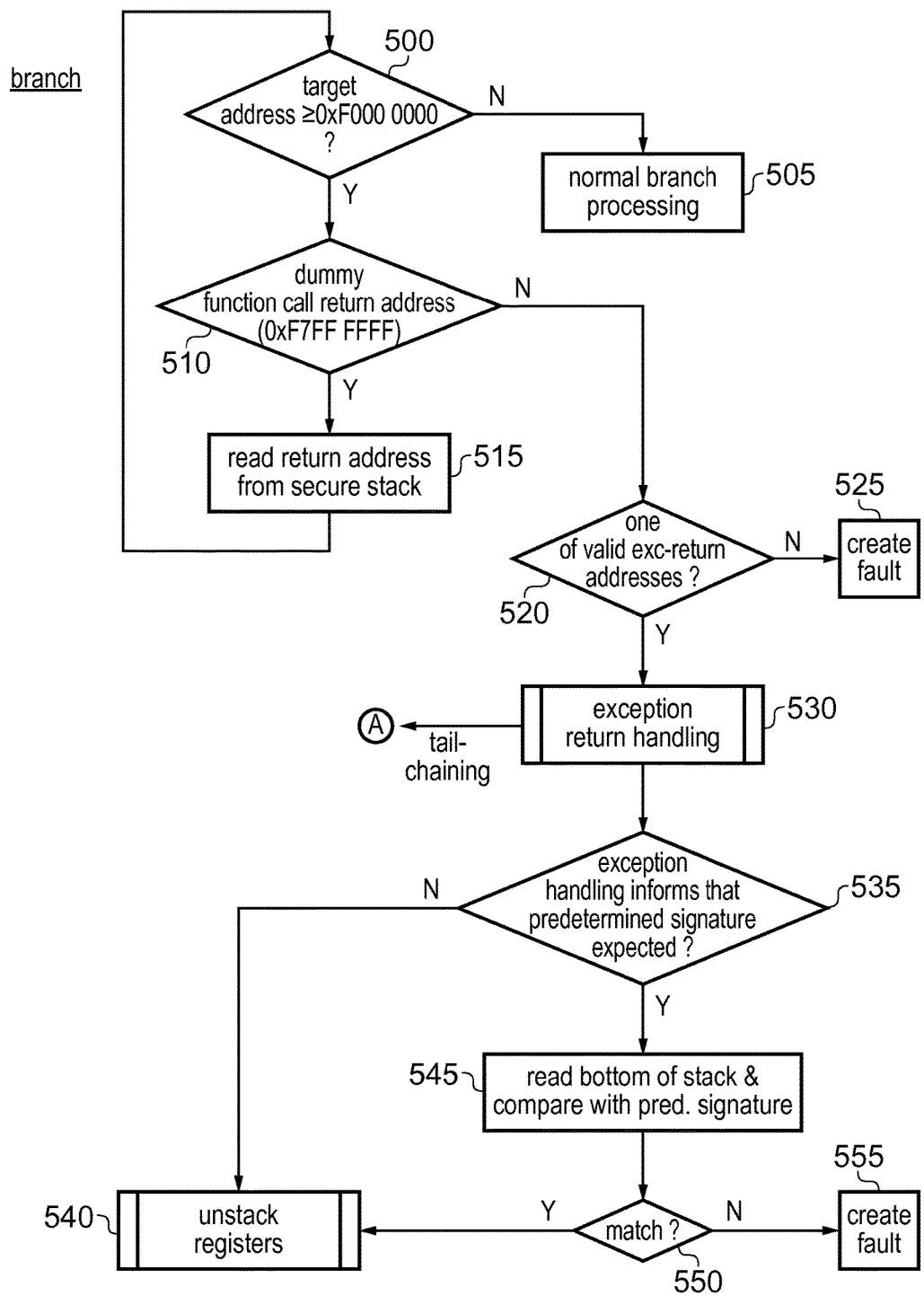
FIG. 7 is a flow diagram illustrating the operation of the processing circuitry in one embodiment when handling a branch operation, including situations where the branch operation is a function call return or an exception return.

FIG. 7 is a flow diagram illustrating how branch operations are processed. Such branch operations may include normal branch processing operations, function call returns and exception returns. Whilst FIG. 7 is shown for branch operations, in alternative embodiments a similar mechanism can be used in association with any instruction which may cause a change in instruction flow, for example a load instruction that has the program counter as the destination register.

At step 500, it is determined whether the target address specified by the branch operation is within the reserved address range 120, in this particular example this being the case if the target address is greater than or equal to 0xF0000000. If not, then this indicates normal branch activity, and the process proceeds step to 505 where normal branch processing is performed. As the handling of branch operations will be well understood by those skilled in the art, no further details of the normal branch processing is provided herein.

If at step 500 it is determined that the target address is within the reserved address range 120, then at step 510 it is determined whether the target address corresponds with the dummy function call return address. In one particular embodiment, the dummy function call return address is 0xF7FFFFFF. If the target address does correspond to the dummy function call return address, then at step 515 the earlier mentioned predetermined relative location of the stack frame 210 within the secure stack is accessed in order to read the return address from the secure stack. Thereafter, the process returns to step 500 where, assuming the function call return has been used correctly to return from an earlier function call, the return address read at step 515 will be a real address for program code, and accordingly the process will branch to normal branch processing at step 505. However, if instead the function call return had been used incorrectly as a mechanism to return from an exception, then when the stack frame 220 is accessed at step 515, the predetermined signature 222 will be retrieved as the actual return address. When that address is then analysed at step 500, it will be determined that it is within the reserved range, but at step 510 it will be determined that that address is not the dummy function call return address. The process will then proceed to step 520, where it will also be determined that that address is not one of the valid exception return addresses, and accordingly the process will branch to step

525, where a fault will be created to identify that a function call return has been used incorrectly.

Considering now the situation where an exception return is specified, then if this exception return is associated with an earlier exception causing a transition from the secure to the less secure domain, this will identify as a target address one of a number of different valid exception return addresses, each of those possible exception return addresses being within the reserved range 120, and being different to both the predetermined signature and the dummy function call return address. Accordingly, the process will proceed from step 500 to step 510, and from there to step 520, where the yes path will then be followed to step 530. Details of the exception return handling step 530 will be described later. In situations where a new exception of lower or equal priority than the current exception and higher priority than the background processing is awaiting execution at the time this current exception returns, then that new lower priority exception will be taken as a tail chained exception (i.e. that new exception will be processed immediately following completion of the current exception, prior to returning to background processing that was taking place prior to the current exception being taken), and the process will branch as shown in FIG. 7 back to step 408 in FIG. 6.

Once the exception return handling of step 530 has been performed and no further tail-chained exception is pending, the process proceeds to step 535 where it is determined whether the exception return handling step 530 has indicated that a predetermined signature should be expected within the processing state stored within the stack frame 210. As discussed earlier, this will be the case if an exception caused a transition from the secure domain to less secure domain, and the background code was executed in the secure domain. If no predetermined signature is expected, then the process merely proceeds to step 540, where the relevant register values are unstacked from the stack frame. This process will be described in more detail later with respect to FIG. 13.

However, if at step 535, it is determined that a predetermined signature is expected, then the process proceeds to step 545, where the bottom of the stack frame 210 is read, and the value retrieved is compared with the predetermined signature. At step 550, it is determined whether there is a match, and if so the process proceeds to step 540. However, if there is not a match, then the process proceeds to step 555, where a fault is created, indicating that an exception return has been incorrectly used to seek to return from a function call. In particular, if the exception return was incorrectly being used to attempt to return from a function call, the reading of the secure stack at step 545 will result in the return address 225 being retrieved, which will not match the predetermined signature, and will accordingly cause the fault to be created at step 555.

There are a number of ways in which the faults created at step 525 or step 555 can be processed. In one embodiment, the processing circuitry is responsive to either fault condition to execute appropriate fault handling program code within the secure domain. By ensuring that the fault handling program code is executed within the secure domain, this prevents an attacker in the less secure domain from regaining control, and accordingly from retrying the attack.

As an alternative mechanism for thwarting any retry of the attack, the data processing apparatus may be arranged such that the stack pointer value is not adjusted if either fault condition is identified, such that replay of the return will also cause the same fault condition to be identified. Accordingly, by not adjusting the stack pointer, the attacker cannot merely consume the last location of the secure stack and then retry the attack in order to enter at a different place within the secure stack. In one embodiment, both of the above mechanisms can be used to provide robustness against retrying of the attack from the less secure domain.

Figure 8A:
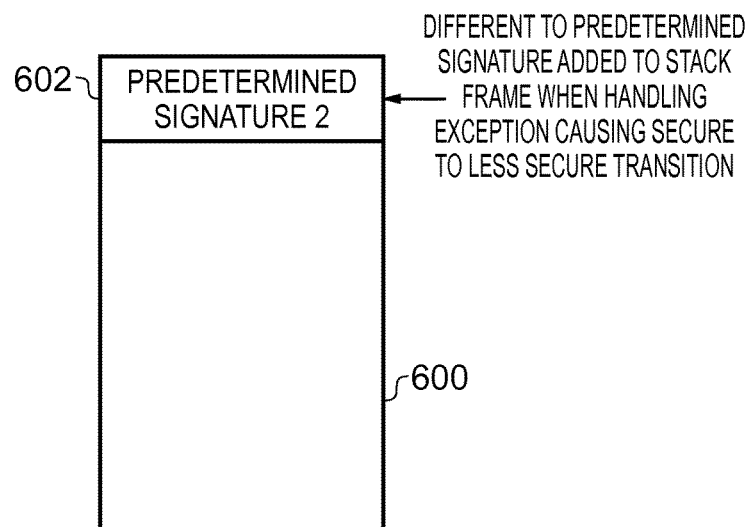
FIGS. 8A and 8B schematically illustrate how a predetermined signature stored on the secure stack when the secure stack is initialised can be used to prevent an unauthorised attempt to branch into secure code from the less secure domain in accordance with one embodiment.
Figure 8B:
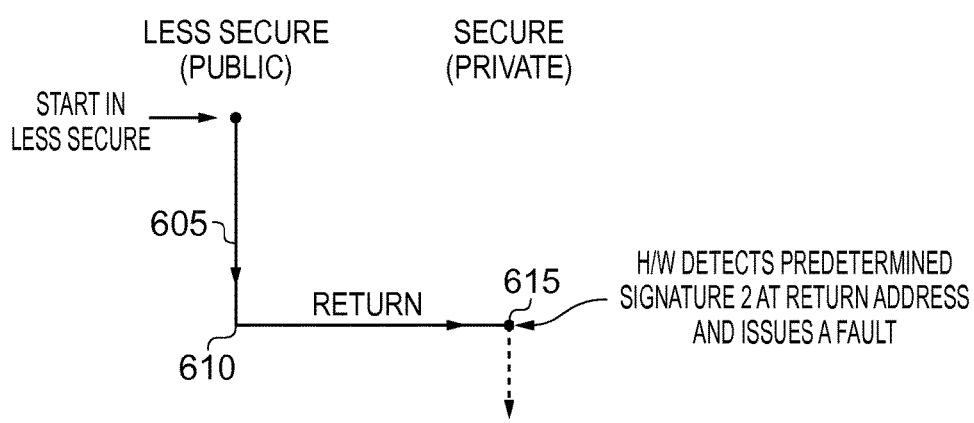

In one embodiment, another scenario that may give rise to a potential attack from the less secure domain arises following initialisation of the secure stack. At this point, the secure stack will be empty. If at that time, the program code being executed is in the less secure domain, it is possible that the program code may attempt to return into the secure domain. Such a return should be prevented, since there is no original transition from the secure domain to the less secure domain to be legitimately returned from. FIGS. 8A and 8B illustrate a mechanism that can be used to prevent such a return being successful. As shown in FIG. 8A, when the secure stack 600 is initialised, a predetermined signature value 602 is stored on the secure stack (in one embodiment, this value being stored by software when the stack is initialised). This predetermined signature value will typically be different to the predetermined signature 222 described earlier with reference to FIG. 4B, but again will be a value that does not correspond to a valid address for program code. In one particular embodiment the predetermined signature 602 has the value 0xF05AEDA5.

As shown in FIG. 8B, if software is executing in the less secure domain at point 605, and then at point 610 attempts to make a return into the secure domain, the fault checking circuitry will at point 615 read the predetermined signature value 602 from the secure stack, will determine that that does not correspond to a valid address for program code, and accordingly will create a fault. Accordingly, the return from the less secure domain will be prevented.

In particular, if the return at point 610 is a function call return, the fault generated at point 615 is the same as the fault created at step 525 in FIG. 7, and the same fault handling code can be used in response to the fault. Hence, in that embodiment, the fault checking circuitry does not need to distinguish between the predetermined signature 602 and the earlier-mentioned predetermined signature 222. If, instead, the return at point 610 is an exception return, then the fact that the predetermined signature value 602 is different to the predetermined signature value 222 will mean that no match will be detected at step 550 of FIG. 7, and accordingly a fault will be raised at step 555.

Figure 9:
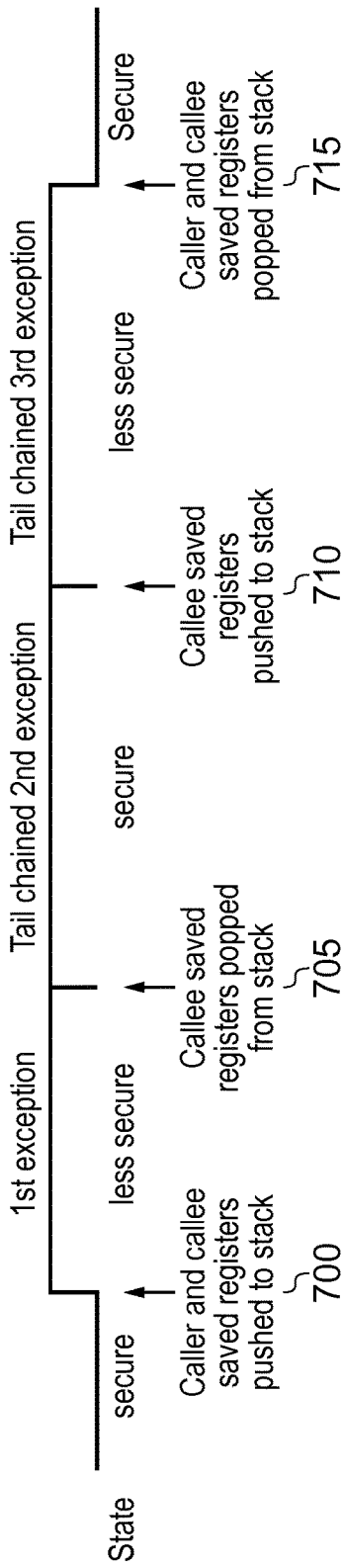
FIG. 9 illustrates an example of performing state saving and restoring operations when handling a chain of tail-chained exceptions.

As described with respect to step 530 in FIG. 7, when returning from one exception, a second exception may be pending and may be processed before returning to the background processing that was performed before the first exception. This is known as tail-chaining. FIG. 9 shows an example where following a first exception, second and third exceptions are tail-chained before switching back to the background processing.

As shown in stack frame 220 of FIG. 4B, if the background processing is in the secure domain and there is a transition from secure processing to an exception in the less secure state, then both the caller saved registers and the callee saved registers are pushed to the secure stack by the exception control circuitry 28. However, typically exceptions that are processed in the secure domain would expect that only the caller saved registers would have been saved to the stack (as shown in stack frame 215 of FIG. 4B), with saving of the callee saved registers being left to the exception handling routine. Therefore, as shown in FIG. 9 it is possible that when the additional state saving of the callee registers has been performed at point 700 on entering the first exception, then when switching to the second exception in the secure domain at point 705, the callee saved registers could be popped from the stack to restore the stack frame 215 that is expected for the tail chained second exception to be processed in the secure domain.

However, if a tail-chained third exception to be processed in the less secure domain occurs, then at point 710 the callee registers need to be pushed to the stack again, because the transition from the secure domain to the less secure domain means that the data in the callee registers need to be hidden from the less secure processing. Finally when the third exception completes and there is no further tail-chained exception, then both the caller and callee saved registers are popped from the stack at point 715 of FIG. 9.

FIG. 9 shows several state saving operations and state restoring operations being performed when switching between tail-chained exceptions. These operations take time and hence delay processing of the incoming exception, and therefore reduce processing performance. Therefore, it is useful to avoid some of these operations. The present technique recognises that it is not necessary for the callee registers to be popped from the secure stack when switching from a less secure exception to a tail-chained secure exception. It is acceptable to leave the callee registers on the stack as this does not affect the processing of the exception and all the secure callee saved values are allowed to be accessed from the secure domain in which the exception is to be processed. Therefore, the callee registers can be saved to the stack in response to the first exception causing a transition from the secure domain to the less secure domain. Restoring of the callee registers can be omitted when processing switches from a less secure exception to a secure tail-chained exception. For further exceptions causing a transition from the secure domain to the less secure domain, the additional state saving of the callee saved registers by the hardware can be omitted.

Figure 10:
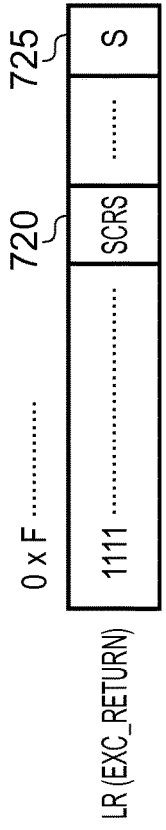
FIG. 10 illustrates an example of using part of an exception return value to indicate status information for controlling state saving operations.

FIG. 10 shows an example of an exception return value which can be stored in the link register on entry to an exception. In one embodiment, the link register 65 need not hold the exception return value for the entire time the exception handling routine is being executed, and instead it may be set to this value at the start, and then moved to the stack shortly after. When the exception completes, the software branches to the address indicated by the exception return value, which the CPU spots as a special event since it is not a valid instruction address. In one embodiment, the earlier mentioned dummy function call return address is also stored in the link register on occurrence of a function call, and handled in a similar manner.

The exception return value includes information for determining whether or not saving of the callee saved registers by hardware is required on entry to an exception causing a transition from the secure domain to the less secure domain. The exception return value has several different possible values, each corresponding to the reserved region 120 of the address space and being different to the dummy function return address and the predetermined signature 222 and 602 described earlier. The exception return address includes a state saving status value field 720 and a security field 725.

The state saving status value field 720 stores a state saving status value SCRS indicating whether, for a following exception which causes a transition from the secure domain to the less secure domain, additional state saving of the callee saved registers is required. In the example of FIG. 10, a value of 0 indicates that the additional state saving can be skipped while a value of 1 indicates that additional state saving is required, although other mappings of the status value can also be used.

The security field 725 stores a security domain value S indicating whether background processing, which was being performed before the initial exception in the current chain of tail-chain exceptions, was in the less secure domain or the secure domain. On entry to each exception in a chain of tail-chained exceptions, the exception return value will be set to a new value in step 432 of FIG. 6. When setting the exception return value, the value of the state saving status value field 720 can be changed to influence the state saving processing to be performed later on. In this way, information can be passed from one exception to another exception to indicate whether additional state saving is required on the next transition between exceptions. This will be explained with reference to FIGS. 11-16.

Figure 11:
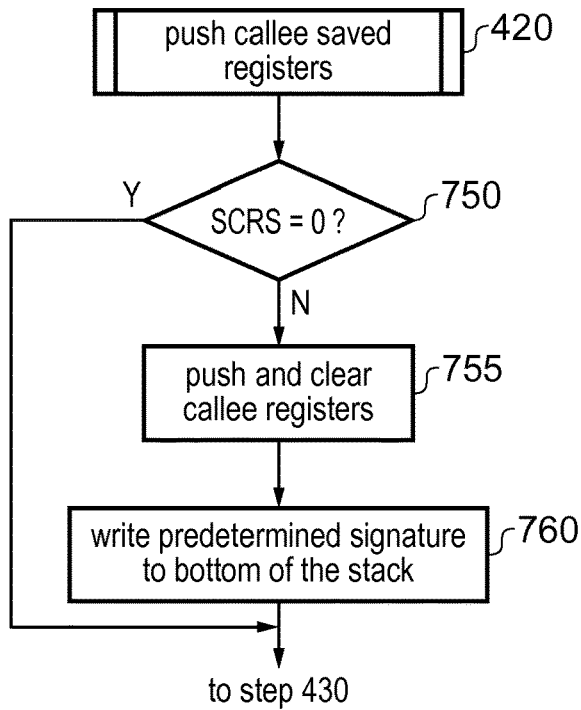
FIG. 11 is a flow diagram showing in more detail a first example of performing state saving of callee registers.

FIG. 11 shows in more detail step 420 of FIG. 6 for pushing the callee saved registers and writing the predetermined signature to the secure stack 36. This additional state saving is dependent on the value of the state saving status values field 720 of the exception return value. At step 750 the processor determines whether or not the state saving status value field 720 of the exception return value has a value of zero. If so, then pushing of the callee saved registers to the stack is skipped and the method continues with step 430 of FIG. 6. In this case, state saving of the callee saved registers would not be necessary because the data from these registers will already have been saved to the stack in response to an earlier exception.

On the other hand, if at step 750 the state saving status value does not have a value of zero then the method proceeds to step 755, and the data from the callee saved registers is pushed to the secure stack. The callee saved registers are also cleared so that their values are inaccessible to subsequent processing in the less secure domain. Also, at step 760 the predetermined signature 222 is written to the bottom of the stack. Then the method proceeds again to step 430 of FIG. 6. Hence, according to FIG. 11, whether or not the additional state saving performed is conditional on the value of the state saving status field.

Figure 12A:
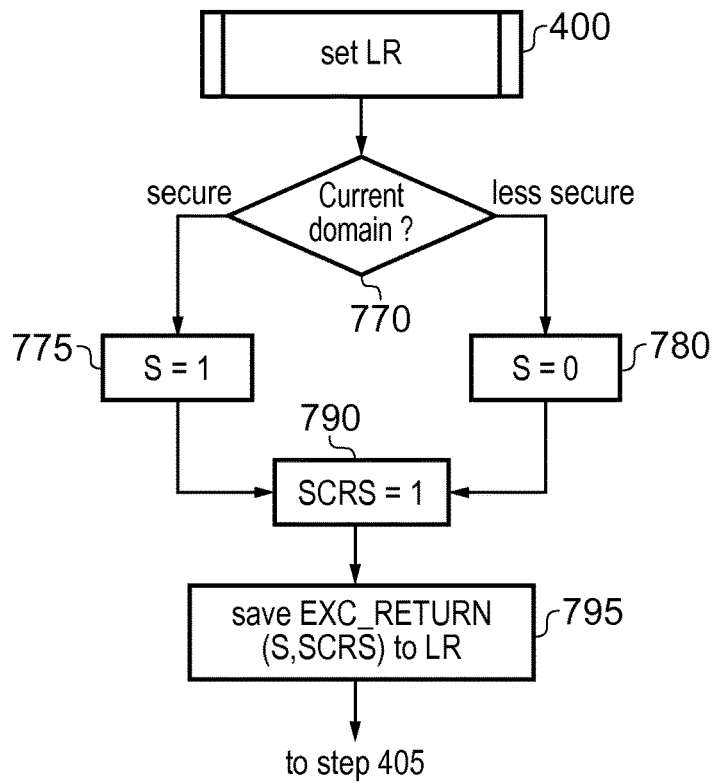
FIG. 12A is a flow diagram showing an example of setting an exception return address on entering an initial exception.

FIG. 12A shows an example of setting the exception return register at step 400 of FIG. 6 for an initial exception received while performing background processing (if there is a chain of tail-chained exceptions this is the very first exception). At step 770, the current domain, in which the processor is operating for the background processing, is determined. If the current domain is the secure domain then at step 775 the security domain field 725 is set to have a value of 1 to indicate the secure domain. If the current domain is a less secure domain then at step 780 the security domain field 725 is set to a value of 0. Regardless of which domain is the current domain, at step 790 the state saving status value field 720 is initialized to a value of 1 indicating that additional state saving may be required at the next transition from the less secure domain to the secure domain. Then, at step 795 the exception return value is written to the link register 65, with the state saving status value field 720 and security field 725 set to the values determined in the earlier steps. The method then proceeds back to step 405 of FIG. 6 to continue the exception entry processing.

Figure 12B:
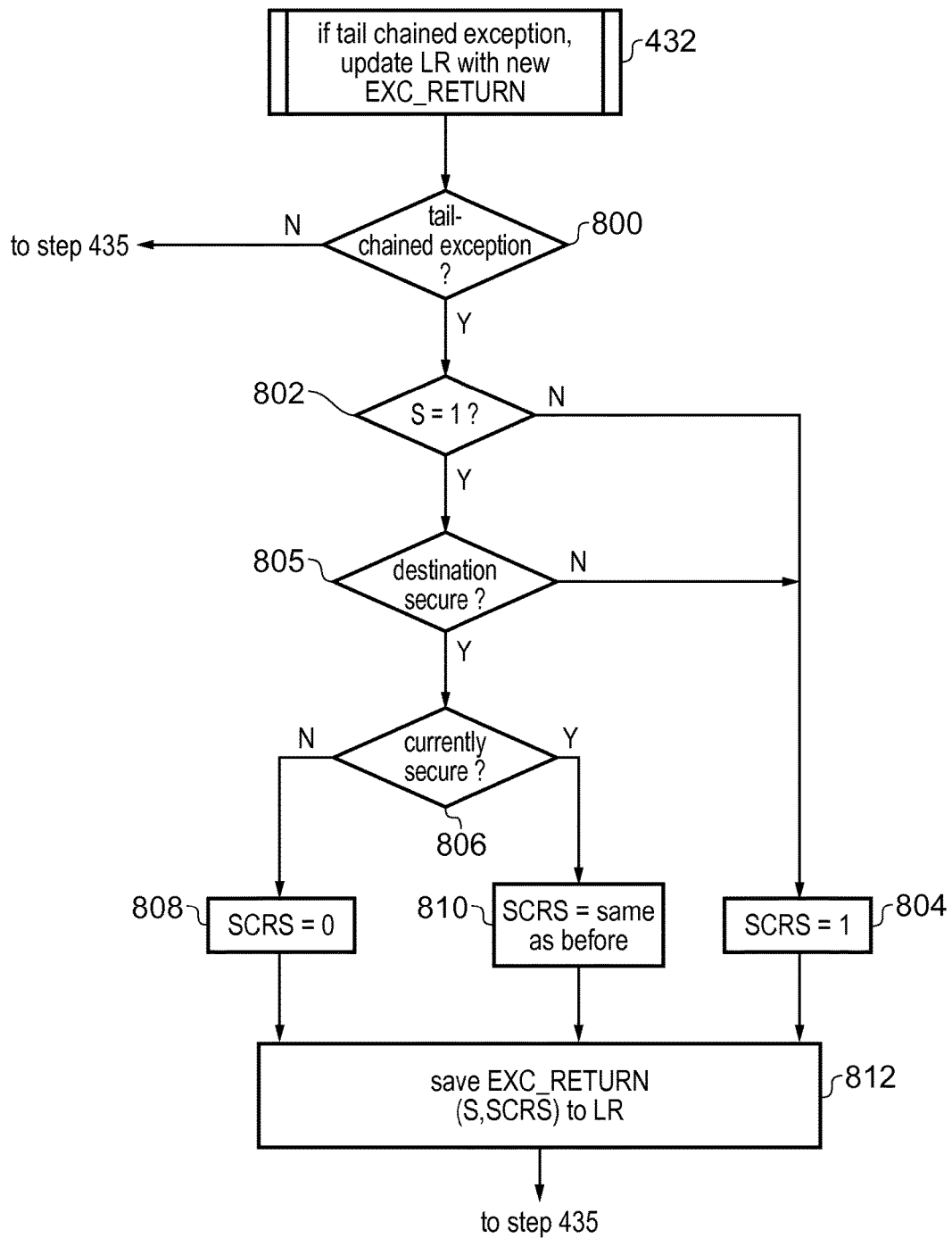
FIG. 12B is a flow diagram showing an example of setting an exception return address on entering a tail-chained exception.

FIG. 12B shows in more detail an example of step 432 for setting the exception return value for a tail-chained exception. At step 800, the method determines whether the exception being entered is a tail-chained exception. If not, then the method proceeds to step 435 of FIG. 6 to branch to the exception handling routine, without performing the remaining steps of FIG. 12B. However, if the exception is a tail-chained exception then at step 802 it is determined whether the security domain value S (from the EXC_RE- TURN value in FIG. 10 used to terminate the previous exception in the chain) is 1. If not, then S=0 and the process proceeds to step 804 to set the state saving status value to 1. If the background processing was less secure (as indicated by S=0), no additional state saving will have been performed (step 408 of FIG. 6 will have caused the additional state saving step 420 to be omitted). While the state saving status value field 720 will in this case not affect state saving, to prevent processing in the less secure domain gaining information from the state saving status value field 720 it is safest to set the field to a default value of 1 at step 804.

On the other hand, if at step 802 the security domain value S equals 1, then the process proceeds to step 805 where it is determined whether the new tail-chained exception is to be processed in the secure domain. If not, then again at step 804 the state saving status value field 720 is set to 1.

If the new exception is to be processed in the secure domain, then at step 806 it is determined whether the current processing is in the secure domain. If not, then at step 808 the state saving status value field 720 is set to 0, while if the current processing is secure then at step 810 the state saving status value field 720 is set to the same value it had for the previous exception. At step 812, the new exception return value is written to the link register 65, with the state saving status value field 720 set according to steps 804, 808 or 810. The method then proceeds to step 435 of FIG. 6 to branch to the exception handling routine.

Figure 13:
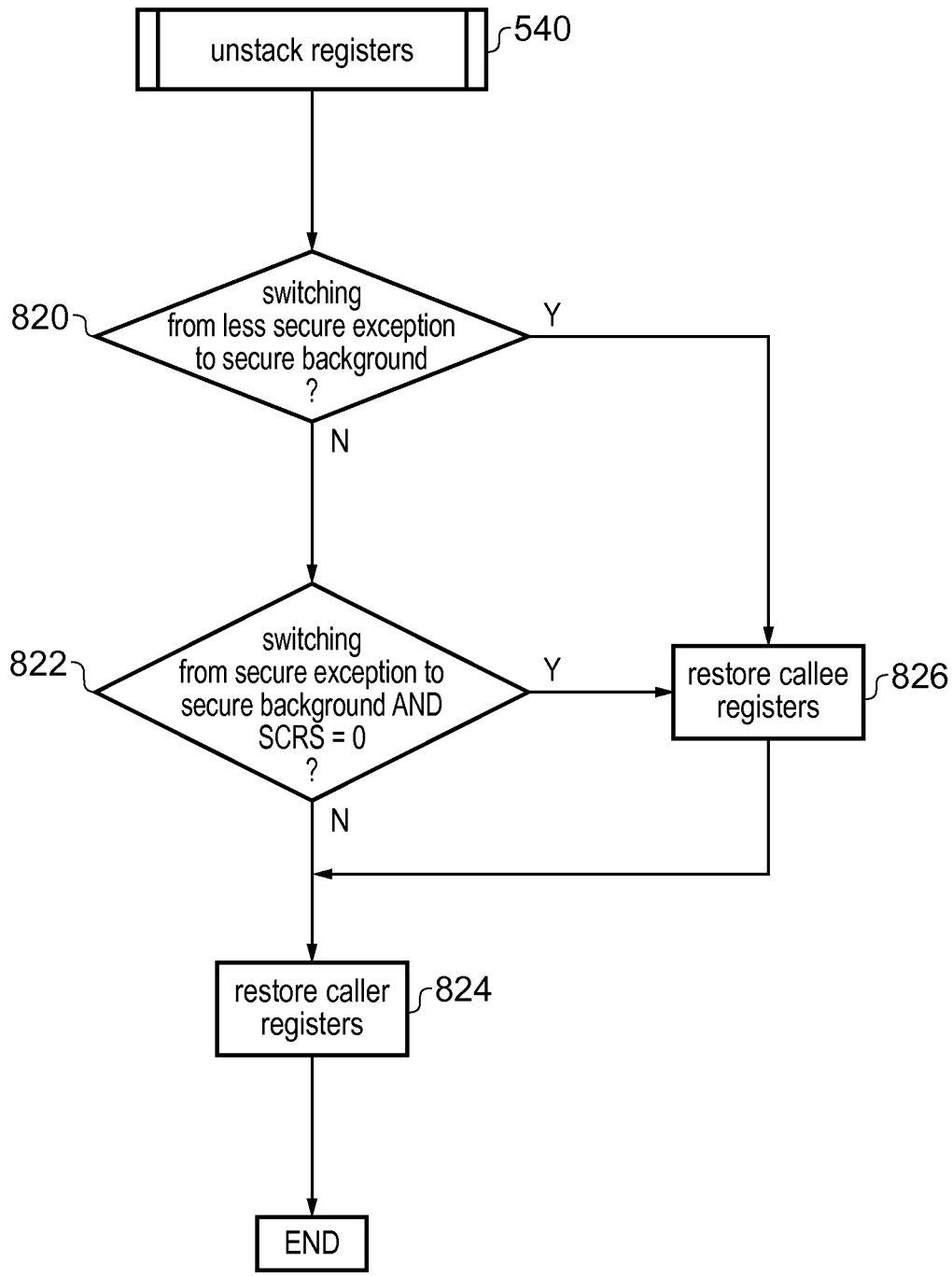
FIG. 13 is a flow diagram showing an example of state restoring performed on returning from an exception.

FIG. 13 shows in more detail step 540 of FIG. 7 for unstacking registers. Depending on the past history of exception processing, the stack may include either the stack frame 215 for which only the caller registers need to be restored or the stack frame 220 for which both the caller and callee saved registers need to be restored. FIG. 13 shows how the processor can determine which stack frame will be present on the stack. At step 820 it is determined whether the current exception return is switching from a less secure exception to secure background processing. For example, the security domain field 725 can be used to determine whether the background processing is secure or less secure. If processing is not switching from a less secure exception to secure background processing, then at step 822 the process determines whether the current exception return is switching from a secure exception to secure background processing and the value of the state saving status value field 720 is zero. If neither of the conditions determined in steps 820 and 822 is satisfied then at step 824 only the caller registers have their values restored from the stack. However, if either of the conditions tested in steps 820 and 822 are satisfied then at step 826 the callee saved values are restored to the callee registers before restoring data to the caller registers at step 824. Hence, the system can determine which registers need their register state to be restored.

Figure 14:
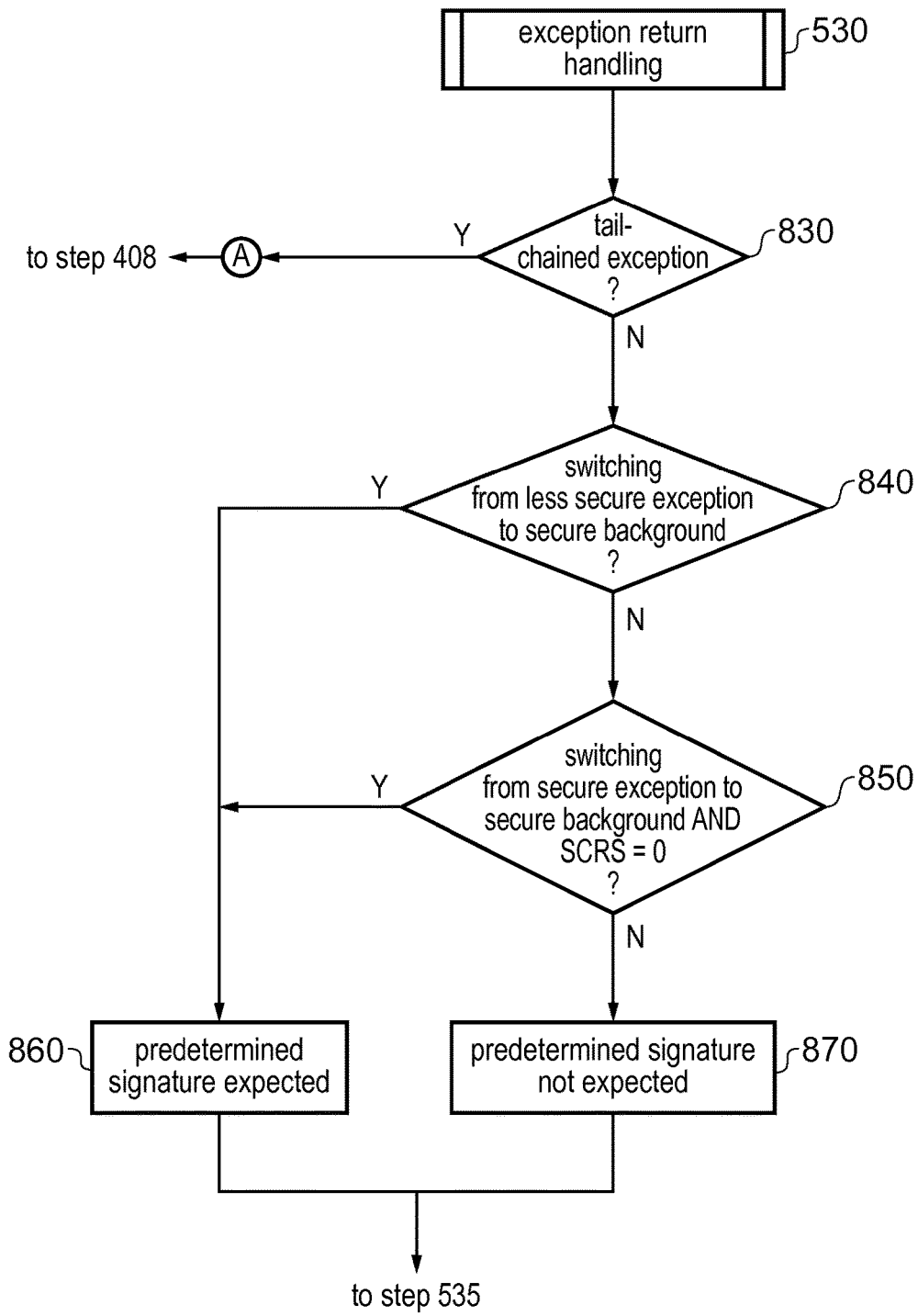
FIG. 14 is a flow diagram showing exception return handling in more detail.

FIG. 14 shows in more detail the exception return handling step 530 of FIG. 7. At step 830 it is determined whether or not there is a pending exception which should be tail-chained. The exception should be tail-chained if its priority is lower than, or equal to, the priority of the exception which has just completed, and is higher than the priority of the background processing. If there is a tail-chained exception to be processed, then the method returns to step 408 of FIG. 6 to handle entry to the tail-chained exception.

If there is no tail-chained exception then the method proceeds to steps 840 and 850 where it is determined whether either (a) the exception return is switching from a less secure exception to secure background processing; or (b) the exception return is switching from a secure exception to secure background processing and the state saving status value field has a value of 0. If either of these conditions is satisfied, then at step 860 it is determined that the predetermined signature 222 is expected. If none of these conditions is satisfied then it is determined at step 870 that the predetermined signature is not expected. The method then proceeds to step 535 of FIG. 7 where processing is performed to detect whether an exception return has inappropriately been used, based on whether the predetermined signature 222 is expected. Note that steps 840 and 850 check for the same two conditions as steps 820 and 822 of FIG. 13, because as shown in stack frame 220 of FIG. 4B, when the callee saved register values are present on the stack, then the predetermined signature will also be expected.

FIGS. 15 and 16 show examples of how unnecessary stack saving and restoring operations shown in FIG. 9 can be avoided using the state saving status value. In FIG. 15 the background processing is in the secure domain when a less secure exception occurs at point 900. As shown in FIG. 12A, the security domain value S is set to 1 to indicate that the background processing was in the secure domain, and the state saving status value SCRS is also set to 1. When the first exception is complete at point 910, there is a pending second exception of equal or lower priority to the first exception and higher priority than the background processing. This exception is tail-chained so that it is processed before going back to background processing. At this point the unstacking of the callee saved registers is skipped. On switching to the second exception, the state saving status value SCRS is set to 0 as shown in step 808 of FIG. 12B, because the background processing was in the secure domain (S=1), the destination is secure and the current process is less secure. Once the second exception has finished processing at point 920, a tail-chained third exception is pending and is to be processed in the less secure domain. Since the state saving status value SCRS equals 0, then according to step 750 of FIG. 11 the additional state saving can be omitted because the callee saved register state has already been saved to the stack. Hence, the third exception can be processed more quickly because there is no delay associated with the additional stacking operations. Finally at point 930 the processing returns to the background and it is determined according to the method of FIG. 13 that the condition at step 820 is satisfied, and so both the callee saved register state and caller saved register state are popped from the stack and restored to the corresponding registers.

FIG. 16 shows another example in which additional stack saving operations can be avoided. In this case, while performing secure background processing, an initial exception to be processed in the secure domain occurs at point 1000. Since the destination is not the less secure domain, according to step 412 of FIG. 6 saving of the callee saved registers will be omitted. Only the caller saved register state is pushed to the stack by hardware at point 1000. The state saving status value is set to 1 as shown in FIG. 12A. At point 1005 a less secure second exception is tail-chained following the first exception. As the state saving status value SCRS equals 1 then at point 1005 the additional state saving is performed according to steps 750 and 755 of FIG. 11, and so the callee saved register state is pushed to the stack. Since S=1 and the destination is less secure, then at step 804 of FIG. 12B the state saving status value is set to 1 for the following exception. At point 1010 a tail-chained transition from the less secure second exception to a secure third exception occurs, and unstacking of the callee saved register is skipped. At this point the state saving status value SCRS is set to 0 according to step 808 of FIG. 12B, because S=1, the destination is secure and the current process is less secure.

This means that at the following tail-chained exception at point 1015 stacking of the callee saved registers can be skipped because the value of the state saving status value is 0. As shown in FIG. 16, even if the initial exception is not a transition causing a switch from the secure domain to the less secure domain, the additional state saving performed at a following switch from the secure domain to the less secure domain can be performed once and will not be repeated on subsequent transitions.

It can be seen from FIGS. 15 and 16 that the mechanism for setting the exception return value as shown in FIG. 14 means that when an exception is being processed in the less secure domain, the state saving status value SCRS will always have a value of 1, meanwhile, while when processing a secure exception the state saving status value has a variable value of 0 or 1 to indicate whether additional state saving will be required at the next secure to less secure transition. This is useful because setting the value to a fixed value of 1 while in the less secure domain prevents code in the less secure domain being able to gain any information from the state saving status value which could allow information to be inferred about the past history of exception processing. This improves security.

Also, if less secure code could tamper with the state saving status value, this could influence subsequent state saving operations while in the secure domain, which could lead to a security breach. To prevent this, the processing circuitry can detect, on switching from a less secure exception to a secure exception (e.g. at point 1010 in FIG. 16) that the state saving status value still has the fixed value to which it was set on entering the exception in the less secure domain, and trigger an error if the value has changed. Alternatively, no error could be triggered, but when returning to the secure domain the state saving status value could be reset to the value it is supposed to have in the secure domain, overriding any modification of the state saving status value field by the less secure code.

Figure 17:
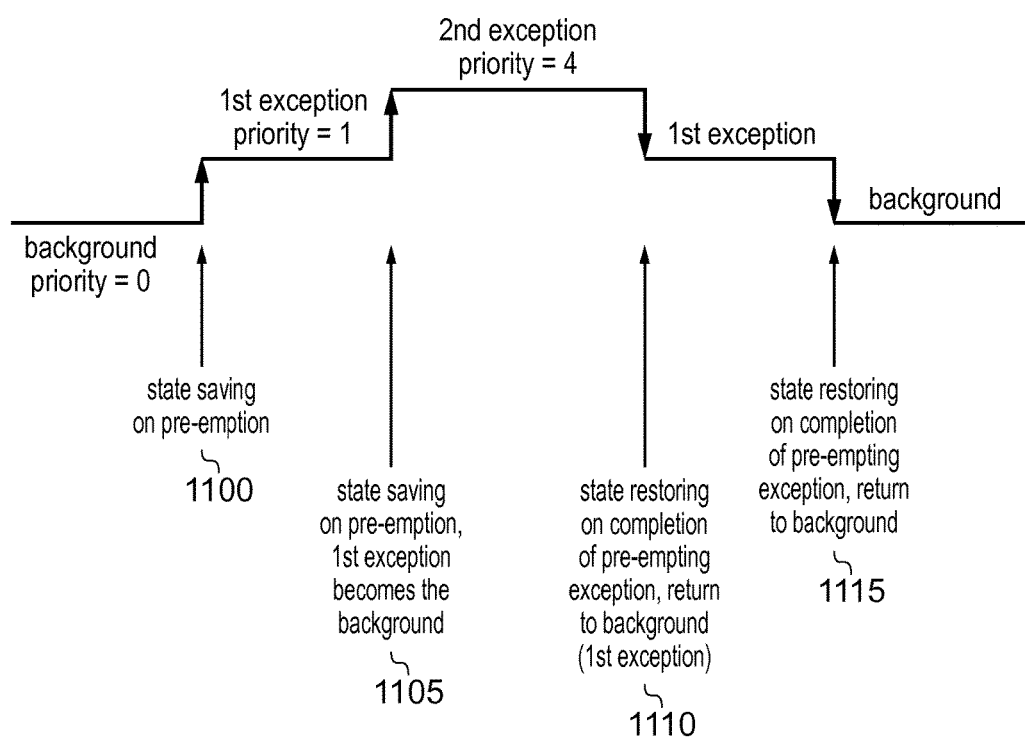
FIG. 17 shows an example of pre-emption of a lower priority exception by a higher priority exception.

FIG. 17 shows an example of pre-emption of exceptions. Each exception may be associated with a priority value. If an exception of a higher priority occurs while an exception of a lower priority is being performed then the high priority exception may pre-empt the lower priority exception and be processed without completing the lower priority exception. While FIG. 17 shows an example in which larger numeric values of the priority value indicate a higher priority, it is also possible to represent higher priorities with lower priority values, e.g. with a priority value of 0 indicating a higher priority exception than a priority value of 1.

As shown in FIG. 17, when a pre-emption occurs, the exception that has been pre-empted can be treated as the background processing for the following exception. For example, at point 1100 of FIG. 17 background processing is interrupted to process a first exception having a priority value of 1. At point 1105 a second exception occurs having a priority value of 4. As this is a higher priority than the current priority level, the second exception pre-empts the first exception and now the first exception is the background processing. When returning from the second exception at point 1110, state restoring will be performed to restore the state that was being used by the background processing (i.e. the first exception) at the time that the second exception occurred. When the first exception completes at point 1115, further state restoring is performed to restore the values used by the original background for processing. Hence, in the earlier embodiments, the "background processing" may itself be processing being performed according to an exception handling routine for an exception which is pre-empted by a higher priority exception.

Figure 18A:
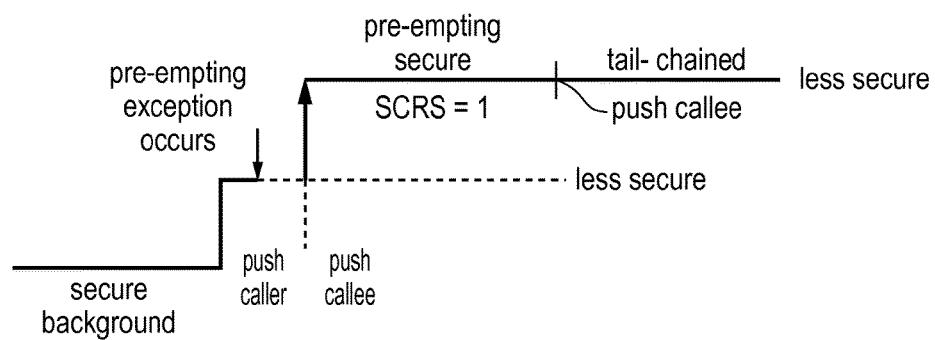
FIGS. 18A and 18B show examples of how state saving can be performed when a pre-emption occurs part way through performing the state saving.
Figure 18B:
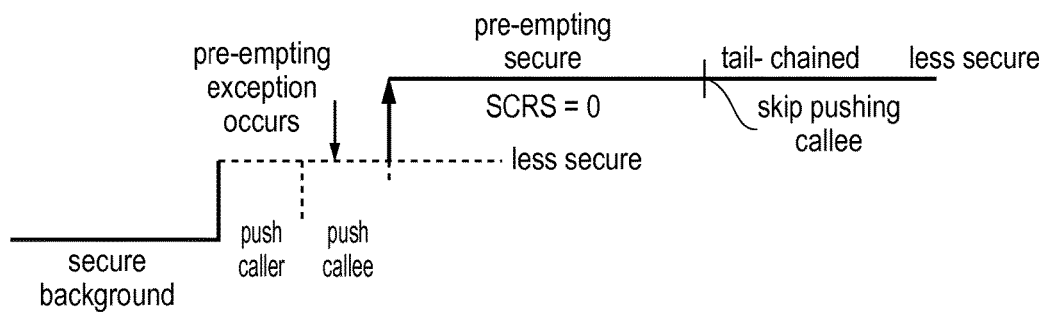

FIGS. 18A and 18B show an example in which the state saving status value can be useful during pre-emption. If the background processing is secure and a less secure exception occurs, then as discussed above both the caller and callee saved registers will be pushed to the stack to prevent access to the callee register state by the less secure exception handler. However, it is possible that another exception of higher priority may occur while this state saving operation is being performed. In this case the higher priority exception will pre-empt the original less secure exception and so the less secure exception will not be processed. If the pre-empting exception is to be processed in the secure domain, it would not be necessary to push the callee saved registers to the stack.

FIG. 18A shows an example where the pre-empting exception occurs while the caller saved registers are being pushed to the stack. In this case, since the pre-empting exception is secure, it is not necessary to perform additional state saving of the callee registers and so once stacking of the caller registers is complete then processing of the secure exception can begin. This avoids a delay caused by pushing the callee register state to the stack. If a subsequent tail-chained less secure exception occurs then as shown in FIG. 18A the callee register state can be pushed to the stack at this point.

On the other hand, FIG. 18B shows an example where the pre-empting exception in the secure domain occurs while the callee registers are being pushed to the stack ready for processing of the original less secure exception. In this case, it can be more efficient to continue pushing the callee registers and to switch to the secure exception when state saving of the callee registers is complete. This is because halting the state saving of the callee registers, and reversing the stacking operations of the callee registers that have already completed, could take longer than simply finishing the state saving. Hence, there will be less of a delay if state saving is completed. The state saving status value SCRS can be set to 0 if the saving of the callee register is completed, to indicate that the additional state saving has already taken place so that it can be skipped when a further less secure tail-chained exception occurs. Hence, the state saving status value also enables a performance improvement when handling pre-emption.

The subject matter of the present application is related to subject matter discussed in commonly assigned co-pending U.S. application Ser. No. 13/368,419 and UK patent application number 1217531.1, and the entire contents of both of these documents are hereby incorporated by reference.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus comprising:
   processing circuitry to perform data processing operations, the processing circuitry being operable in a secure domain and a less secure domain;
   a stack pointer register to store a stack pointer value;
   stack access circuitry to, in response to an event requiring a transition from the secure domain to the less secure domain, store a data item to a secure stack within a data store at a given location determined relative to the stack pointer value, the data item comprising a return address when said event is of a first event type, and comprising a first value when said event is of a second event type; and fault checking circuitry configured, on receipt of a first event type return from the less secure domain, to identify a first fault condition if the data item stored at the given location comprises the first value indicating that said event was of the second event type, wherein one of the first event type and the second event type comprises a function call, and the other of said first event type and the second event type comprises an exception.

2. A data processing apparatus as claimed in claim 1, wherein said first event type is a function call and said second event type is an exception.

3. A data processing apparatus as claimed in claim 1, wherein:
if said event is said first event type, the processing circuitry is configured to provide a dummy return address to the program code in said less secure domain that is used to process said first event type, the dummy return address not being a valid address for program code; and
on completing the program code in said less secure domain that is used to process said first event type, the dummy return address causing said return address to be fetched from the data store.

4. A data processing apparatus as claimed in claim 2, wherein:
if the event is an exception, the data item stored by the stack access circuitry includes a predetermined signature; and
the fault checking circuitry is configured on receipt of an exception return from the less secure domain to the secure domain to identify a second fault condition if the predetermined signature is not present within the data item stored by the stack access circuitry.

5. A data processing apparatus as claimed in claim 4, wherein the predetermined signature forms said first value stored at said given location, such that both said first and second fault conditions are detectable using the predetermined signature.

6. A data processing apparatus as claimed in claim 4, wherein:
if said event is a function call, the processing circuitry is configured to provide a dummy function call return address to the program code in said less secure domain that is identified by said function call, the dummy function call return address being selected from a range of addresses that are not valid addresses for program code; and
said predetermined signature has a different value to said dummy function call return address.

7. A data processing apparatus as claimed in claim 4, wherein:
if said event is an exception, the processing circuitry is configured to provide a dummy exception return address to the program code in said less secure domain that is used to process said exception, the dummy exception return address being selected from a range of addresses that are not valid addresses for program code; and
said predetermined signature has a different value to said dummy exception return address.

8. A data processing apparatus as claimed in claim 1, wherein said given location is a predetermined location within a stack frame used by the stack access circuitry.

9. A data processing apparatus as claimed in claim 8, wherein said given location is a bottom location of said stack frame.

10. A data processing apparatus as claimed in claim 1, wherein the processing circuitry is responsive to said first fault condition to execute fault handling program code within said secure domain.

11. A data processing apparatus as claimed in claim 1, wherein said stack pointer value is not adjusted if said first fault condition is identified, such that replay of the first event type return will also cause said first fault condition to be identified.

12. A data processing apparatus as claimed in claim 4, wherein the processing circuitry is responsive to said second fault condition to execute fault handling program code within said secure domain.

13. A data processing apparatus as claimed in claim 4, wherein said stack pointer value is not adjusted if said second fault condition is identified, such that replay of the exception return will also cause said second fault condition to be identified.

14. A data processing apparatus as claimed in claim 1, wherein:
on initialization, a second value is stored at said given location in said data store, said second value being different to said first value and also not being a valid address for program code; and
said fault checking circuitry is configured on receipt of a return from the less secure domain to the secure domain to identify a third fault condition if the data stored in said given location is said second value.

15. A data processing apparatus as claimed in claim 1, further comprising:
a plurality of registers; and
if the event is an exception, the data item stored by the stack access circuitry further comprises the content of at least a subset of said registers.

16. A data processing apparatus as claimed in claim 1, wherein:
said data store provides a plurality of stacks comprising a secure stack and a less secure stack; and
said processing circuitry is configured to determine which stack to store data to, or load data from, based on the domain in which background processing was being performed.

17. A data processing apparatus as claimed in claim 1, wherein the first value is not a valid address for program code.

18. A method of processing data on a data processing apparatus, said data processing apparatus comprising processing circuitry to perform data processing operations, the processing circuitry being operable in a secure domain and a less secure domain, and a stack pointer register to store a stack pointer value, the method comprising:
storing, in response to an event requiring a transition from the secure domain to the less secure domain, a data item to a secure stack within a data store at a given location determined relative to the stack pointer value, the data item comprising a return address when said event is of a first event type, and comprising a first value when said event is of a second event type; and
on receipt of a first event type return from the less secure domain, identifying a first fault condition if the data item stored at the given location comprises the first value indicating that said event was of the second event type,
wherein one of the first event type and the second event type comprises a function call, and the other of said first event type and the second event type comprises an exception.

19. A data processing apparatus comprising:
means for performing data processing operations, the means or performing being operable in a secure domain and a less secure domain;
means for storing a stack pointer value;
means for storing, in response to an event requiring a transition from the secure domain to the less secure domain, a data item to a secure stack within a data store at a given location determined relative to the stack pointer value, the data item comprising a return address when said event is of a first event type, and comprising a first value when said event is of a second event type; and
fault checking means for identifying, on receipt of a first event type return from the less secure domain, a first fault condition if the data item stored at the given location comprises the first value indicating that said event was of the second event type,
wherein one of the first event type and the second event type comprises a function call, and the other of said first event type and the second event type comprises an exception.

* * * * *